United States Patent
Read et al.

(10) Patent No.: US 8,442,784 B1
(45) Date of Patent: *May 14, 2013

(54) ADAPTIVE POWER CONTROL BASED ON PRE PACKAGE CHARACTERIZATION OF INTEGRATED CIRCUITS

(76) Inventors: Andrew Read, Sunnyvale, CA (US); Malcolm Wing, Palo Alto, CA (US); Louis C. Kordus, Redwood City, CA (US); Thomas E. Stewart, Plano, TX (US)

(*) Notice: Subject to any disclaimer, the term of this patent is extended or adjusted under 35 U.S.C. 154(b) by 540 days.

This patent is subject to a terminal disclaimer.

(21) Appl. No.: 11/810,516

(22) Filed: Jun. 5, 2007

Related U.S. Application Data

(63) Continuation of application No. 10/334,748, filed on Dec. 31, 2002, now Pat. No. 7,228,242.

(51) Int. Cl.
*G01R 15/00* (2006.01)
*G01R 21/00* (2006.01)

(52) U.S. Cl.
USPC .............. 702/57; 702/60; 702/65; 702/182

(58) Field of Classification Search ............. 702/59–69, 702/119–126, 182–186, 188
See application file for complete search history.

(56) References Cited

U.S. PATENT DOCUMENTS

| | | |
|---|---|---|
| 4,246,517 A | 1/1981 | Dakroub |
| 4,769,784 A | 9/1988 | Doluca et al. |
| 4,798,974 A | 1/1989 | Reczek et al. |
| 4,912,347 A | 3/1990 | Morris |
| 4,929,621 A | 5/1990 | Manoury et al. |
| 5,039,877 A | 8/1991 | Chern |
| 5,086,501 A | 2/1992 | DeLuca et al. |
| 5,113,088 A | 5/1992 | Yamamoto et al. |
| 5,124,632 A | 6/1992 | Greaves |
| 5,167,024 A | 11/1992 | Smith et al. |
| 5,201,059 A | 4/1993 | Nguyen |
| 5,204,863 A | 4/1993 | Saint-Joigny et al. |
| 5,218,704 A | 6/1993 | Watts, Jr. et al. |
| 5,230,055 A | 7/1993 | Katz et al. |
| 5,239,652 A | 8/1993 | Seibert et al. |
| 5,254,883 A | 10/1993 | Horowitz et al. |
| 5,336,986 A | 8/1994 | Allman |
| 5,386,135 A | 1/1995 | Nakazato et al. |
| 5,394,026 A | 2/1995 | Yu et al. |
| 5,406,212 A | 4/1995 | Hashinaga et al. |
| 5,422,591 A | 6/1995 | Rastegar et al. |
| 5,422,806 A | 6/1995 | Chen et al. |

(Continued)

FOREIGN PATENT DOCUMENTS

| | | |
|---|---|---|
| EP | 0381021 | 8/1990 |
| EP | 0501655 | 9/1992 |

(Continued)

OTHER PUBLICATIONS

"Computer Software", Wikipedia, http://en.wikipedia.org/wiki/software, retrieved May 2, 2007.

(Continued)

*Primary Examiner* — Phuong Huynh

(57) ABSTRACT

A method and system of adaptive power control based on pre package characterization of integrated circuits. Characteristics of a specific integrated circuit are used to adaptively control power of the integrated circuit.

14 Claims, 15 Drawing Sheets

U.S. PATENT DOCUMENTS

| | | | |
|---|---|---|---|
| 5,440,520 A | 8/1995 | Schutz et al. | |
| 5,447,876 A | 9/1995 | Moyer et al. | |
| 5,461,266 A | 10/1995 | Koreeda et al. | |
| 5,483,434 A | 1/1996 | Seesink | |
| 5,495,184 A | 2/1996 | Des Rosiers et al. | |
| 5,502,838 A | 3/1996 | Kikinis | |
| 5,506,541 A | 4/1996 | Herndon | |
| 5,511,203 A | 4/1996 | Wisor et al. | |
| 5,519,309 A | 5/1996 | Smith | |
| 5,560,020 A | 9/1996 | Nakatani et al. | |
| 5,592,173 A | 1/1997 | Lau et al. | |
| 5,682,093 A | 10/1997 | Kivela | |
| 5,692,204 A | 11/1997 | Rawson et al. | |
| 5,717,319 A | 2/1998 | Jokinen | |
| 5,719,800 A | 2/1998 | Mittal et al. | |
| 5,727,208 A * | 3/1998 | Brown | 713/100 |
| 5,744,996 A | 4/1998 | Kotzle et al. | |
| 5,745,375 A | 4/1998 | Reinhardt et al. | |
| 5,752,011 A | 5/1998 | Thomas et al. | |
| 5,754,869 A | 5/1998 | Holzhammer et al. | |
| 5,757,171 A | 5/1998 | Babcock | |
| 5,778,237 A | 7/1998 | Yamamoto et al. | |
| 5,781,060 A | 7/1998 | Sugawara | |
| 5,812,860 A * | 9/1998 | Horden et al. | 713/322 |
| 5,815,724 A | 9/1998 | Mates | |
| 5,818,290 A | 10/1998 | Tsukada | |
| 5,825,674 A | 10/1998 | Jackson | |
| 5,838,189 A | 11/1998 | Jeon | |
| 5,842,860 A | 12/1998 | Funt | |
| 5,848,281 A | 12/1998 | Smalley et al. | |
| 5,884,049 A | 3/1999 | Atkinson | |
| 5,894,577 A | 4/1999 | MacDonald et al. | |
| 5,900,773 A | 5/1999 | Susak | |
| 5,920,226 A | 7/1999 | Mimura | |
| 5,923,545 A | 7/1999 | Nguyen | |
| 5,929,621 A | 7/1999 | Angelici et al. | |
| 5,933,649 A | 8/1999 | Lim et al. | |
| 5,940,020 A | 8/1999 | Ho | |
| 5,940,785 A | 8/1999 | Georgiou et al. | |
| 5,940,786 A | 8/1999 | Steeby | |
| 5,952,871 A | 9/1999 | Jeon | |
| 5,974,557 A | 10/1999 | Thomas et al. | |
| 5,986,947 A | 11/1999 | Choi et al. | |
| 5,996,083 A | 11/1999 | Gupta et al. | |
| 5,996,084 A | 11/1999 | Watts | |
| 5,999,040 A | 12/1999 | Do et al. | |
| 6,006,169 A | 12/1999 | Sandhu et al. | |
| 6,018,264 A | 1/2000 | Jin | |
| 6,021,500 A | 2/2000 | Wang et al. | |
| 6,035,407 A | 3/2000 | Gebara et al. | |
| 6,047,248 A | 4/2000 | Georgiou et al. | |
| 6,048,746 A | 4/2000 | Burr | |
| 6,078,084 A | 6/2000 | Nakamura et al. | |
| 6,078,319 A | 6/2000 | Bril et al. | |
| 6,087,820 A | 7/2000 | Houghton et al. | |
| 6,087,892 A | 7/2000 | Burr | |
| 6,091,283 A | 7/2000 | Murgula et al. | |
| 6,100,751 A | 8/2000 | De et al. | |
| 6,118,306 A | 9/2000 | Orton et al. | |
| 6,119,241 A | 9/2000 | Michail et al. | |
| 6,141,762 A | 10/2000 | Nicol et al. | |
| 6,157,092 A | 12/2000 | Hofmann | |
| 6,202,104 B1 | 3/2001 | Ober | |
| 6,215,235 B1 | 4/2001 | Osamura | |
| 6,216,235 B1 | 4/2001 | Thomas et al. | |
| 6,218,708 B1 | 4/2001 | Burr | |
| 6,226,335 B1 | 5/2001 | Prozorov | |
| 6,229,379 B1 | 5/2001 | Okamoto | |
| 6,232,830 B1 | 5/2001 | Fournel | |
| 6,272,642 B2 | 8/2001 | Pole, II et al. | |
| 6,279,048 B1 | 8/2001 | Fadavi-Ardekani et al. | |
| 6,281,716 B1 | 8/2001 | Mihara | |
| 6,303,444 B1 | 10/2001 | Burr | |
| 6,304,824 B1 | 10/2001 | Bausch et al. | |
| 6,305,407 B1 | 10/2001 | Selby | |
| 6,311,287 B1 | 10/2001 | Dischler et al. | |
| 6,314,522 B1 | 11/2001 | Chu et al. | |
| 6,320,453 B1 | 11/2001 | Manning | |
| 6,337,593 B1 | 1/2002 | Mizuno et al. | |
| 6,345,362 B1 | 2/2002 | Bertin et al. | |
| 6,345,363 B1 | 2/2002 | Levy-Kendler | |
| 6,347,379 B1 | 2/2002 | Dai et al. | |
| 6,370,046 B1 | 4/2002 | Nebrigic et al. | |
| 6,373,323 B2 | 4/2002 | Kuroda | |
| 6,373,325 B1 | 4/2002 | Kuriyama | |
| 6,378,081 B1 | 4/2002 | Hammond | |
| 6,388,432 B2 | 5/2002 | Uchida | |
| 6,415,388 B1 | 7/2002 | Browning et al. | |
| 6,424,203 B1 | 7/2002 | Bayadroun | |
| 6,424,217 B1 | 7/2002 | Kwong | |
| 6,425,086 B1 | 7/2002 | Clark et al. | |
| 6,427,211 B2 | 7/2002 | Watts, Jr. | |
| 6,442,746 B1 | 8/2002 | James et al. | |
| 6,457,135 B1 | 9/2002 | Cooper | |
| 6,466,077 B1 | 10/2002 | Miyazaki et al. | |
| 6,469,573 B2 | 10/2002 | Kanda et al. | |
| 6,476,632 B1 | 11/2002 | La Rosa et al. | |
| 6,477,654 B1 | 11/2002 | Dean et al. | |
| 6,486,729 B2 | 11/2002 | Imamiya | |
| 6,487,668 B2 | 11/2002 | Thomas et al. | |
| 6,489,224 B1 | 12/2002 | Burr | |
| 6,496,027 B1 | 12/2002 | Sher et al. | |
| 6,496,057 B2 | 12/2002 | Wada et al. | |
| 6,510,400 B1 | 1/2003 | Moriyama | |
| 6,510,525 B1 | 1/2003 | Nookala et al. | |
| 6,513,124 B1 | 1/2003 | Furuichi et al. | |
| 6,518,828 B2 | 2/2003 | Seo et al. | |
| 6,519,706 B1 | 2/2003 | Ogoro | |
| 6,529,421 B1 | 3/2003 | Marr et al. | |
| 6,531,912 B2 | 3/2003 | Katou | |
| 6,563,371 B2 | 5/2003 | Buckley, III et al. | |
| 6,570,371 B1 | 5/2003 | Volk | |
| 6,574,577 B2 | 6/2003 | Stapleton et al. | |
| 6,574,739 B1 | 6/2003 | Kung et al. | |
| 6,600,346 B1 | 7/2003 | Macaluso | |
| 6,617,656 B2 | 9/2003 | Lee et al. | |
| 6,642,774 B1 | 11/2003 | Li | |
| 6,675,360 B1 | 1/2004 | Cantone et al. | |
| 6,677,643 B2 | 1/2004 | Iwamoto et al. | |
| 6,700,434 B2 | 3/2004 | Fujii et al. | |
| 6,731,221 B1 | 5/2004 | Dioshongh et al. | |
| 6,737,909 B2 | 5/2004 | Jaussi et al. | |
| 6,741,118 B2 | 5/2004 | Uchikoba et al. | |
| 6,774,705 B2 | 8/2004 | Miyazaki et al. | |
| 6,784,722 B2 | 8/2004 | Tang et al. | |
| 6,791,146 B2 | 9/2004 | Lai et al. | |
| 6,791,212 B2 | 9/2004 | Pulvirenti et al. | |
| 6,792,379 B2 | 9/2004 | Ando | |
| 6,803,633 B2 | 10/2004 | Mergens et al. | |
| 6,809,968 B2 | 10/2004 | Marr et al. | |
| 6,865,116 B2 | 3/2005 | Kim et al. | |
| 6,882,172 B1 | 4/2005 | Suzuki et al. | |
| 6,889,331 B2 | 5/2005 | Soerensen et al. | |
| 6,906,582 B2 | 6/2005 | Kase et al. | |
| 6,917,240 B2 | 7/2005 | Trafton et al. | |
| 6,922,783 B2 | 7/2005 | Knee et al. | |
| 6,927,620 B2 | 8/2005 | Senda | |
| 6,936,898 B2 | 8/2005 | Pelham et al. | |
| 6,967,522 B2 | 11/2005 | Chandrakasan et al. | |
| 6,986,068 B2 | 1/2006 | Togawa | |
| 6,992,508 B2 | 1/2006 | Chow | |
| 7,012,461 B1 | 3/2006 | Chen et al. | |
| 7,030,681 B2 | 4/2006 | Yamazaki et al. | |
| 7,096,145 B2 * | 8/2006 | Orenstien et al. | 702/132 |
| 7,100,061 B2 | 8/2006 | Halepete et al. | |
| 7,119,604 B2 | 10/2006 | Chih | |
| 7,120,804 B2 | 10/2006 | Tschanz et al. | |
| 7,129,771 B1 | 10/2006 | Chen | |
| 7,228,242 B2 | 6/2007 | Read et al. | |
| 7,362,165 B1 | 4/2008 | Chen | |
| 7,562,233 B1 | 7/2009 | Sheng et al. | |
| 7,774,625 B1 * | 8/2010 | Sheng et al. | 713/300 |
| 7,941,675 B2 * | 5/2011 | Burr et al. | 713/300 |
| 7,953,990 B2 * | 5/2011 | Stewart et al. | 713/300 |
| 2001/0028577 A1 | 10/2001 | Sung et al. | |
| 2002/0011650 A1 | 1/2002 | Nishizawa et al. | |
| 2002/0026597 A1 | 2/2002 | Dai et al. | |

| | | | |
|---|---|---|---|
| 2002/0067638 A1 | 6/2002 | Kobayashi et al. | |
| 2002/0073348 A1 | 6/2002 | Tani | |
| 2002/0083356 A1 | 6/2002 | Dai | |
| 2002/0087219 A1 | 7/2002 | Dai | |
| 2002/0087896 A1 | 7/2002 | Cline et al. | |
| 2002/0116650 A1 | 8/2002 | Halepete et al. | |
| 2002/0130701 A1 | 9/2002 | Kleveland | |
| 2002/0138778 A1 | 9/2002 | Cole et al. | |
| 2002/0140494 A1 | 10/2002 | Thomas et al. | |
| 2002/0194509 A1 | 12/2002 | Plante et al. | |
| 2003/0006590 A1 | 1/2003 | Aoki et al. | |
| 2003/0036876 A1 | 2/2003 | Fuller, III et al. | |
| 2003/0065960 A1* | 4/2003 | Rusu et al. | 713/300 |
| 2003/0071657 A1 | 4/2003 | Soerensen et al. | |
| 2003/0074591 A1 | 4/2003 | McClendon et al. | |
| 2003/0098736 A1 | 5/2003 | Uchikoba et al. | |
| 2003/0189465 A1 | 10/2003 | Abadeer et al. | |
| 2004/0025061 A1 | 2/2004 | Lawrence | |
| 2004/0073821 A1 | 4/2004 | Naveh et al. | |
| 2004/0103330 A1 | 5/2004 | Bonnett | |
| 2004/0108881 A1 | 6/2004 | Bokui et al. | |
| 2004/0246044 A1 | 12/2004 | Myono et al. | |
| 2005/0225376 A1 | 10/2005 | Kin Law | |
| 2007/0283176 A1 | 12/2007 | Tobias et al. | |

FOREIGN PATENT DOCUMENTS

| | | |
|---|---|---|
| EP | 0504655 | 9/1992 |
| EP | 0624909 | 11/1994 |
| EP | 0978781 | 9/2000 |
| EP | 1398639 | 3/2004 |
| EP | 0474963 | 9/2009 |
| JP | 63223480 | 9/1988 |
| JP | 63233480 | 9/1988 |
| JP | 04114365 | 4/1992 |
| JP | 11118845 | 4/1999 |
| JP | 2000172383 | 6/2000 |
| JP | 2001345693 | 12/2001 |
| JP | 2003324735 | 11/2003 |
| JP | 409185589 | 9/2009 |
| WO | 0127728 | 4/2001 |
| WO | 0238828 | 5/2002 |
| WO | 03/041403 | 7/2004 |

OTHER PUBLICATIONS

"High Speed Digitally Adjusted Step-Down Controllers for Notebook CPUS"; Max1710/Max1711; MAXIM Manual; p. 11 and p. 21.
"Operation U (Refer to Functional Diagram)". TLC 1736, Linear Technology Manual, p. 9.
"Shmoo plotting: the black art of IC testing", (Baker et al.), IEEE design & test of computers, pp. 90-97, Jul. 1997 [XP783305].
"Wafer Burn-In Isolation Circuit", IBM Technical Disclosure Bulletin, IBM Corp., New York, US, vol. 32, No. 6B, Nov. 1, 1989, pp. 442-443, XP00073858 ISSN:0018-8689 the whole document.
CMOS Circuit Design, Layout Simulation; R. Jacob Baker, Harry W. Li, David E. Boyce; IEEE Press; 1998.
Desai et al., "Sizing of Clock Distribution Networks for High Performance CPU Chips", Digital Equipment Corporation, Hudson, MA, pp. 389-394, 1996.
Hsu, Jui-Ching, "Fabrication of Single Walled Carbon Nanotube (SW-CNT) Cantilevers for Chemical Sensing", M. Sc Thesis, Louisiana State University, Dec. 2007.
Merriam-Webster's Collegiate Dictionary, tenth edition, pp. 252 and 603 (Merriam-Webster Inc., Springfield, Mass, USA).
Oner, H. et al., "A compact monitoring circuit for real-time on-chip diagnosis of hot-carrier induced degradation", Microelectronic Test Structures, 1997. ICMTS 1997. Proceedings, IEEE International Conference on Monterey, CA, Mar. 17-20, 1997, pp. 72-76.
Advisory Action Dated May 7, 2007; U.S. Appl. No. 10/334,918.
Final Rejection Dated Jan. 31, 2007; U.S. Appl. No. 10/334,918.
Final Rejection Dated Feb. 15, 2006; U.S. Appl. No. 10/334,918.
Final Rejection Dated Aug. 4, 2009; U.S. Appl. No. 10/334,918.
Final Rejection Dated Oct. 30, 2006; U.S. Appl. No. 10/334,918.
Final Rejection Dated Nov. 26, 2008; U.S. Appl. No. 10/334,918.
Non-Final Office Action Dated Feb. 18, 2009; U.S. Appl. No. 10/334,918.
Non-Final Office Action Dated May 13, 2008; U.S. Appl. No. 10/334,918.
Non-Final Office Action Dated May 15, 2006; U.S. Appl. No. 10/334,918.
Non-Final Office Action Dated Jun. 13, 2005; U.S. Appl. No. 10/334,918.
Final Rejection Dated Jan. 6, 2009; U.S. Appl. No. 10/334,919.
Final Rejection Dated Feb. 21, 2007; U.S. Appl. No. 10/334,919.
Final Rejection Dated Mar. 9, 2006; U.S. Appl. No. 10/334,919.
Non-Final Office Action Dated May 15, 2007; U.S. Appl. No. 10/334,919.
Non-Final Office Action Dated May 28, 2009; U.S. Appl. No. 10/334,919.
Non-Final Office Action Dated Jun. 13, 2005; U.S. Appl. No. 10/334,919.
Non-Final Office Action Dated Jul. 21, 2008; U.S. Appl. No. 10/334,919.
Non-Final Office Action Dated Aug. 7, 2006; U.S. Appl. No. 10/334,919.
Non-Final Office Action Dated Nov. 23, 2007; U.S. Appl. No. 10/334,919.
International Preliminary Examination Report 157WO, Oct. 1, 2005.
International Preliminary Examining Authority, Written Opinion 157WO, Aug. 10, 2004.
International Search Report 157WO, May 10, 2004.
Non-Final Office Action Dated Jun. 24, 2004; U.S. Appl. No. 10/334,748.
Notice of Allowance Dated Jan. 5, 2005; U.S. Appl. No. 10/334,748.
Notice of Allowance Dated Aug. 10, 2006; U.S. Appl. No. 10/334,748.
Notice of Allowance Dated Sep. 22, 2005; U.S. Appl. No. 10/334,748.
Non-Final Office Action Dated Aug. 21, 2007; U.S. Appl. No. 10/334,748.
Restriction Requirement Dated Mar. 19, 2007; U.S. Appl. No. 10/334,748.
Final Office Action Dated Apr. 13, 2005; U.S. Appl. No. 10/747,015.
Final Office Action Dated Dec. 2, 2005; U.S. Appl. No. 10/747,015.
Non-Final Office Action Dated Apr. 18, 2006; U.S. Appl. No. 10/747,015.
Non-Final Office Action Dated Jul. 29, 2005; U.S. Appl. No. 10/747,015.
Non-Final Office Action Dated Dec. 23, 2004; U.S. Appl. No. 10/747,015.
Notice of Allowance Dated Jun. 21, 2006; U.S. Appl. No. 10/747,015.
Non-Final Office Action Dated Aug. 1, 2007; U.S. Appl. No. 11/591,431.
Notice of Allowance Dated Dec. 13, 2007; U.S. Appl. No. 11/591,431.
Non-Final Office Action Dated Feb. 3, 2009; U.S. Appl. No. 10/874,407.
Non-Final Office Action Dated Aug. 9, 2006; U.S. Appl. No. 10/874,407.
Notice of Allowance Dated Jul. 13, 2009; U.S. Appl. No. 10/874,407.
Notice of Allowance Dated Oct. 1, 2008; U.S. Appl. No. 10/874,407.
Notice of Allowance Dated Nov. 23, 2007; U.S. Appl. No. 11/591,431.
Non-Final Office Action Dated Dec. 23, 2004; U.S. Appl. No. 12/107,733.
Non-Final Office Action Dated May 21, 2009; U.S. Appl. No. 12/107,733.
Final Office Action Dated Mar. 9, 2009; U.S. Appl. No. 12/107,733.
Final Office Action Dated Apr. 22, 2005; U.S. Appl. No. 10/747,016.
Final Office Action Dated Oct. 30, 2007; U.S. Appl. No. 10/747,016.
Final Office Action Dated Dec. 7, 2006; U.S. Appl. No. 10/747,016.
Non-Final Office Action Dated Mar. 20, 2008; U.S. Appl. No. 10/747,016.
Non-Final Office Action Dated May 16, 2007; U.S. Appl. No. 10/747,016.
Non-Final Office Action Dated Jun. 23, 2006; U.S. Appl. No. 10/747,016.

Non-Final Office Action Dated Nov. 18, 2005; U.S. Appl. No. 10/747,016.
Non-Final Office Action Dated Dec. 22, 2004; U.S. Appl. No. 10/747,016.
Notice of Allowance Dated Mar. 13, 2009; U.S. Appl. No. 10/747,016.
Notice of Allowance Dated Aug. 20, 2009; U.S. Appl. No. 10/747,016.
Notice of Allowance Dated Aug. 27, 2008; U.S. Appl. No. 10/747,016.
Notice of Allowance Dated Dec. 18, 2008; U.S. Appl. No. 10/747,016.
Non-Final Office Action Dated Dec. 22, 2004; U.S. Appl. No. 10/747,022.
Notice of Allowance Dated Sep. 28, 2005; U.S. Appl. No. 10/747,022.
Final Office Action Dated Jan. 12, 2009; U.S. Appl. No. 10/746,539.
Final Office Action Dated Apr. 2, 2008; U.S. Appl. No. 10/746,539.
Final Office Action Dated Apr. 11, 2005; U.S. Appl. No. 10/746,539.
Final Office Action Dated Jun. 15, 2007; U.S. Appl. No. 10/746,539.
Final Office Action Dated Aug. 31, 2006; U.S. Appl. No. 10/746,539.
Final Office Action Dated Dec. 19, 2005; U.S. Appl. No. 10/746,539.
Non-Final Office Action Dated Jan. 23, 2007; U.S. Appl. No. 10/746,539.
Non-Final Office Action Dated Apr. 11, 2006; U.S. Appl. No. 10/746,539.
Non-Final Office Action Dated Jun. 2, 2009; U.S. Appl. No. 10/746,539.
Non-Final Office Action Dated Aug. 11, 2005; U.S. Appl. No. 10/746,539.
Non-Final Office Action Dated Aug. 25, 2008; U.S. Appl. No. 10/746,539.
Non-Final Office Action Dated Nov. 30, 2007; U.S. Appl. No. 10/746,539.
Non-Final Office Action Dated Dec. 10, 2004; U.S. Appl. No. 10/746,539.
Final Office Action Dated Jan. 23, 2007; U.S. Appl. No. 11/358,482.
Final Office Action Dated May 23, 2008; U.S. Appl. No. 11/358,482.
Final Office Action Dated Aug. 23, 2007; U.S. Appl. No. 11/358,482.
Non-Final Office Action Dated Apr. 4, 2007; U.S. Appl. No. 11/358,482.
Non-Final Office Action Dated Jul. 23, 2009; U.S. Appl. No. 11/358,482.
Non-Final Office Action Dated Oct. 14, 2008; U.S. Appl. No. 11/358,482.
Non-Final Office Action Dated Dec. 26, 2007; U.S. Appl. No. 11/358,482.
Final Office Action Dated Feb. 28, 2007; U.S. Appl. No. 10/874,772.
Final Office Action Dated Jun. 20, 2007; U.S. Appl. No. 10/874,772.
Final Office Action Dated Sep. 6, 2006; U.S. Appl. No. 10/874,772.
Notice of Allowance Dated Apr. 2, 2008; U.S. Appl. No. 10/874,772.
Notice of Allowance Dated Nov. 20, 2007; U.S. Appl. No. 10/874,772.

* cited by examiner

ADAPTIVE POWER CONTROL BASED ON PRE PACKAGE CHARACTERIZATION OF INTEGRATED CIRCUITS

RELATED APPLICATION

This Application is a Continuation Application of, and claims priority to, commonly owned U.S. patent application Ser. No. 10/334,748, now U.S. Pat. No. 7,228,242, filed Dec. 31, 2002, which is hereby incorporated herein in its entirety by reference for all purposes.

FIELD OF THE INVENTION

Embodiments of the present invention relate to the manufacture and operation of integrated circuits. More particularly, embodiments of the present invention relate to computer implemented processes for operating an integrated circuit at an optimal voltage for that integrated circuit.

BACKGROUND ART

A significant problem faced by mobile, e.g., battery powered computers is the length of time such computers are capable of operating between charges. An additional concern is heat dissipation of the electronics. As computer processors become more capable, they tend to run at higher clock rates and to dissipate more power. In addition, more capable peripherals, e.g., higher capacity hard drives and wireless high speed networks, also compete with the main computer processor for an ever-increasing portion of the available battery power. At the same time, the size and weight of portable computers is constantly being reduced to make them more portable. Since batteries generally are a very significant component of the weight of portable computers and other portable devices, the tendency has been to maintain battery size and thus battery capacity at a minimum. The compact nature of portable devices also intensifies heat dissipation issues.

A great deal of time, expense and effort has been directed to techniques for extending the operating life of portable computers. Presently, typical processors and computer systems include circuitry and software for disabling various power-draining functions of portable computers when those functions are unused for some extensive period. For example, various techniques have been devised for turning off the display screen when it has not been used for some selected period. Similar processes measure the length of time between use of hard drives and disable rotation after some period. Another of these processes is adapted to put a central processor into a quiescent condition after a period of inactivity.

In general, these processes are useful in extending the operating life of a portable computer. However, the life still does not in general achieve a desirable duration. In fact, battery life is a highly competitive specification among portable processor and computer manufacturers, and there is an almost universal desire for more battery life.

There has been a significant amount of research conducted from which processors requiring less power might be produced. Most processors used in computer systems today are made using complimentary metal oxide semiconductor (CMOS) technology. The power consumed by a CMOS integrated circuit is comprised of two components, a static portion and a dynamic portion. Dynamic power is given approximately by $p=CV^2f$, where C is the active switching capacitance, V is the supply voltage, and f is the frequency of operation, and static power is expressed as idle or "off" current times voltage.

It is desirable to operate a processor at the lowest possible voltage at a frequency that provides the computing resource desired by the user at any given moment. For instance, if a processor is operating at 600 MHz, and the user runs a process that is only half as demanding of the processor, the frequency can be decreased by approximately a factor of two. Correspondingly, in many cases the voltage can also be decreased by a factor of two. Therefore, dynamic power consumption can be reduced by a factor of eight. Various methods of implementing this dynamic frequency-voltage scaling have been described in the conventional art.

A highly effective system for adjusting voltage to correspond with processing demands is commercially available on processors from Transmeta Corporation of Santa Clara, Calif. Embodiments of such systems are described in U.S. patent application Ser. No. 09/484,516, entitled Adaptive Power Control, to S. Halepete et al., filed Jan. 18, 2000, and assigned to the assignee of the present Application.

Halepete et al. disclose a processor's ability to dynamically adapt its voltage and clock frequency to correspond to the demands placed on the processor by software. Because dynamic power varies linearly with clock speed and by the square of voltage, adjusting both can produce cubic or higher order reductions in dynamic power consumption, whereas prior processors could adjust power only linearly (by only adjusting the frequency).

FIG. 1 illustrates an exemplary operating frequency versus supply voltage curve 110 for the operation of a microprocessor, according to the conventional art. Curve 110 indicates the required supply voltage Vdd to achieve a desired frequency of operation. For example, in order to operate at frequency 120, a supply voltage 160 is required.

Curve 110 may be established as a standard for a population of microprocessors, e.g., by collecting frequency versus voltage information for a number of microprocessor samples. By using a variety of well known statistical analysis methods, curve 110 may be established to achieve an optimal trade-off of performance and process yield. For example, curve 110 may be established such that 90% of all production exhibits better frequency-voltage performance than curve 110. Using curve 110, a set of frequency-voltage operating points may be established. For example, frequency 150 is paired with voltage 190, frequency 140 with voltage 180, frequency 130 with voltage 170 and frequency 120 with voltage 160. Such a set of frequency-voltage pairings (or points) may also be expressed in the form of a table, as illustrated in Table 1, below:

TABLE 1

| Frequency | Supply Voltage |
| --- | --- |
| 150 | 190 |
| 140 | 180 |
| 130 | 170 |
| 120 | 160 |

Such processors are configured to operate at a number of different frequency and voltage combinations, or points. Special power management software monitors the processor and dynamically switches between these operating points as runtime conditions change in order to advantageously minimize dynamic power consumption by the processor.

Unfortunately, in the prior art, such power management software has been limited to operate with a single set of frequency-voltage operating points. A set of frequency-voltage operating points is determined, for example, during qualification testing of a specific processor model for a specific manufacturing process, and used in the operation of every device of that processor model. Such a set of frequency-voltage operating points is determined based upon a worst case operation of a population of processor devices, determined, e.g., prior to general availability of the processor devices.

Numerous characteristics related to power consumption of a processor integrated circuit ("microprocessor") are highly variable across a manufacturing process. For example, maximum operating frequency, threshold voltage and capacitance may each vary by 30% or more, from batch to batch and even within the same wafer. Leakage current is exponential to the threshold voltage and may vary by 500% from nominal. As an unfortunate consequence, such a set of frequency-voltage operating points is based upon the worst case operation of a population of processor devices, determined, e.g., during a qualification process, generally prior to general availability of the processor devices.

Many processors, typically a majority of a manufactured population, are able to operate at more desirable frequency-voltage operating points than the single standard set based upon worst case performance. For example, if the standard set specifies 600 MHz operation at 1.2 volts, many individual processor devices may be able to operate at 600 MHz at only 1.1 volts. Such better performing processors, however, are detrimentally set to operate at the standard frequency-voltage operating point, wasting power. Further, such parts will typically have a lower threshold voltage, and if forced to operate at a higher supply voltage will demonstrate an increased leakage current. Both effects consume excess power and cause an undesirably shorter battery life than is optimal for such a particular processor device.

In addition, during the commercial lifetime of a processor model, numerous refinements and improvements in its manufacturing processes are typically made. Some of these may improve the power characteristics of the processor population, for example, rendering the pre-existing standard set of frequency-voltage operating points less than optimal.

The conventional art has focused primarily on reducing the dynamic power consumption of microprocessors. Unfortunately, static power consumption in modern semiconductor processes, e.g., processes with a minimum feature size of about 0.13 microns and smaller, is no longer a negligible component of total power consumption. For such processes, static power may be one-half of total power consumption. Further, static power, as a percentage of total power, is tending to increase with successive generations of semiconductor process.

For example, maximum operating frequency is generally proportional to the quantity $(1-Vt/Vdd)$, that is, one minus the threshold voltage divided by the supply voltage (for small process geometries). As process geometry shrinks, supply voltage (Vdd) typically also is decreased in order to avoid deleterious effects such as oxide breakdown. Consequently, threshold voltage should also be decreased in order to maintain or increase a desirable maximum operating frequency. Correspondingly, gate oxides are made thinner so that a gate can maintain control of the channel. A thinner gate oxide leads to an increased gate capacitance. Since "off" or leakage current of a CMOS device is generally proportional to gate capacitance, the trend to make gate oxides thinner tends to increase leakage current. Unfortunately, increasing leakage current deleteriously increases static power consumption. As an unfortunate result, the on-going decrease in semiconductor process size also leads to an ever-increasing share of total power consumption deriving from static power dissipation.

In addition, because leakage current is influenced by numerous aspects of device geometry and implant characteristics, static power may vary by as much as 500% above or below nominal levels. As performance in terms of power consumption is a critical attribute for a mobile processor, processor manufacturers typically test and certify that a part will meet a particular clock rate at a maximum power level, e.g., 1 GHz at 8.5 watts. When operating with a fixed set of frequency-voltage operating points, such a maximum power level must be achieved at a voltage specified by the set of frequency-voltage operating points.

If a particular processor device is unable to meet the maximum power limit at the standard frequency-voltage operating point, then it is rejected or placed into a higher power, and therefore less desirable category or "bin" at manufacturing test. Such a part represents a yield loss and a loss of potential revenue to the manufacturer. However, such a part may oftentimes be able to achieve both the required clock rate and power consumption specifications at a lower voltage.

Thus, while the systems and techniques of controlling frequency-voltage operating points in the prior art have brought about improvements in reduced power consumption of processors, the use of a standard set of operating points across a variable population of processors results in less than optimal power consumption and manufacturing yield losses that are highly undesirable.

SUMMARY OF THE INVENTION

Therefore, systems and methods of adaptive power control based on pre package characterization of integrated circuits reflective of characteristics of specific integrated circuits are required.

DETAILED DESCRIPTION OF THE INVENTION

Figure 1:
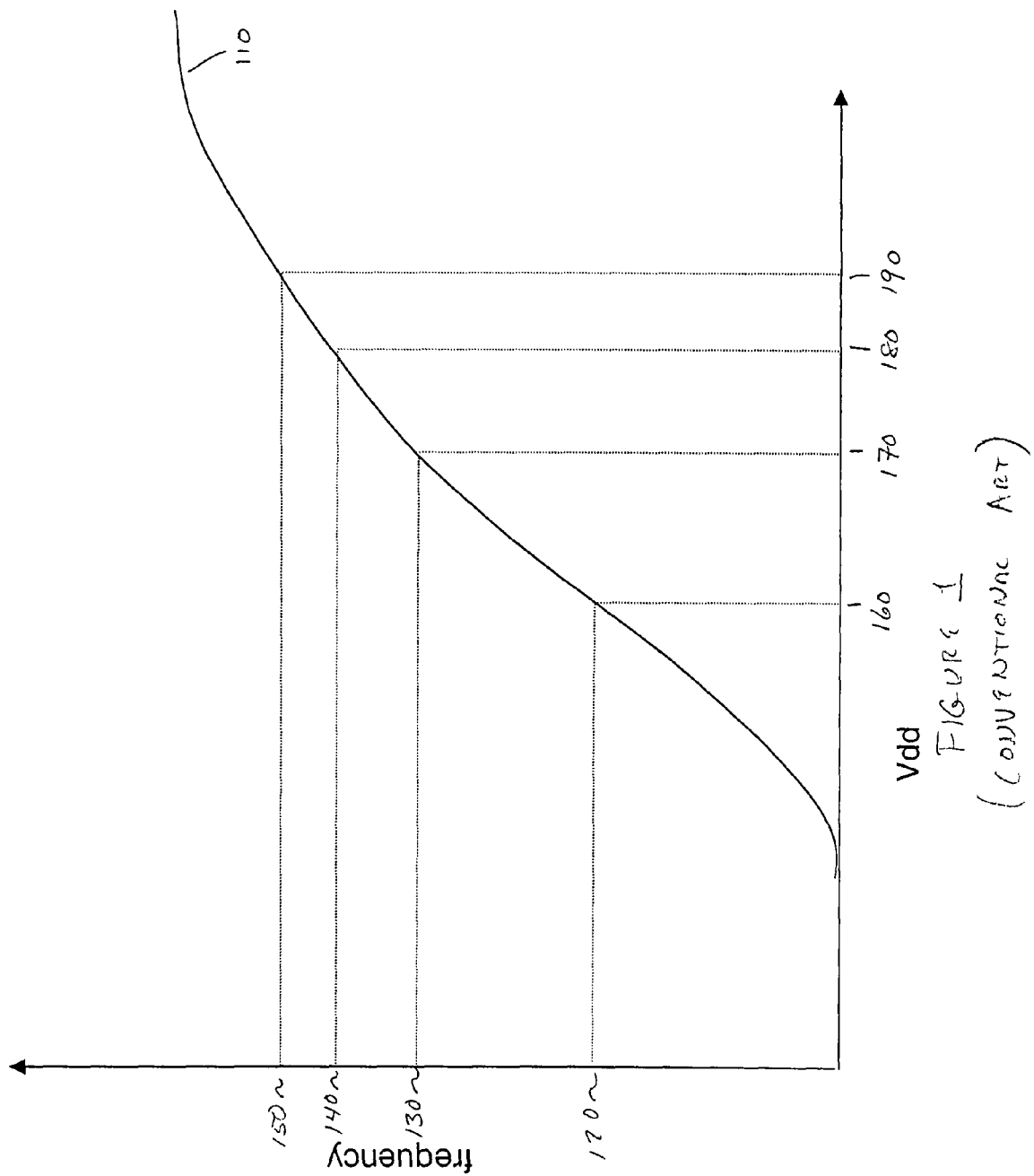
FIG. 1 illustrates an exemplary operating frequency versus supply voltage curve for the operation of a microprocessor, according to the conventional art.

In the following detailed description of the present invention, adaptive power control based on pre package characterization of integrated circuits, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 600, 700, 800, 900, 1000, 1100, 1200 and 1300) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions or firmware leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "indexing" or "processing" or "computing" or "translating" or "calculating" or "determining" or "selecting" or "storing" or "recognizing" or "generating" or "selecting" or "moving" or "encoding" or "combining" or "testing" of "setting" or "operating" or "transforming" or "determining" or "optimizing" or "synthesizing" or "grouping" or "estimating" or "describing" or "measuring" or "recording" or "associating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Adaptive Power Control Based on Pre Package Characterization of Integrated Circuits Embodiments of the present invention are described in the context of design and operation of highly integrated semiconductors. More particularly, embodiments of the present invention relate to adaptive power management of microprocessors. It is appreciated, however, that elements of the present invention may be utilized in other areas of semiconductor operation.

U.S. patent application Ser. No. 09/484,516, entitled Adaptive Power Control, to S. Halepete et al., filed Jan. 18, 2000, is hereby incorporated herein by reference in its entirety.

A semiconductor manufacturing process is generally considered to be highly self-consistent, that is, the process is very good at producing "exact" copies of an integrated circuit design. This is especially the case for semiconductor products operated in the digital domain. Functionally, the semiconductor arts have succeeded in producing essentially perfect copies that function similarly.

However, numerous analog characteristics of a semiconductor are highly variable. For example, threshold voltage, capacitance, gate delay, current consumption, minimum operating voltage and maximum operating frequency may vary 30% or more from chip to chip. Leakage, or "off" current may be even more variable. For example, it is not uncommon for leakage current to vary 500% above or below a nominal level. More particularly, parameters related to power consumption of an integrated circuit are highly variable.

Figure 2:
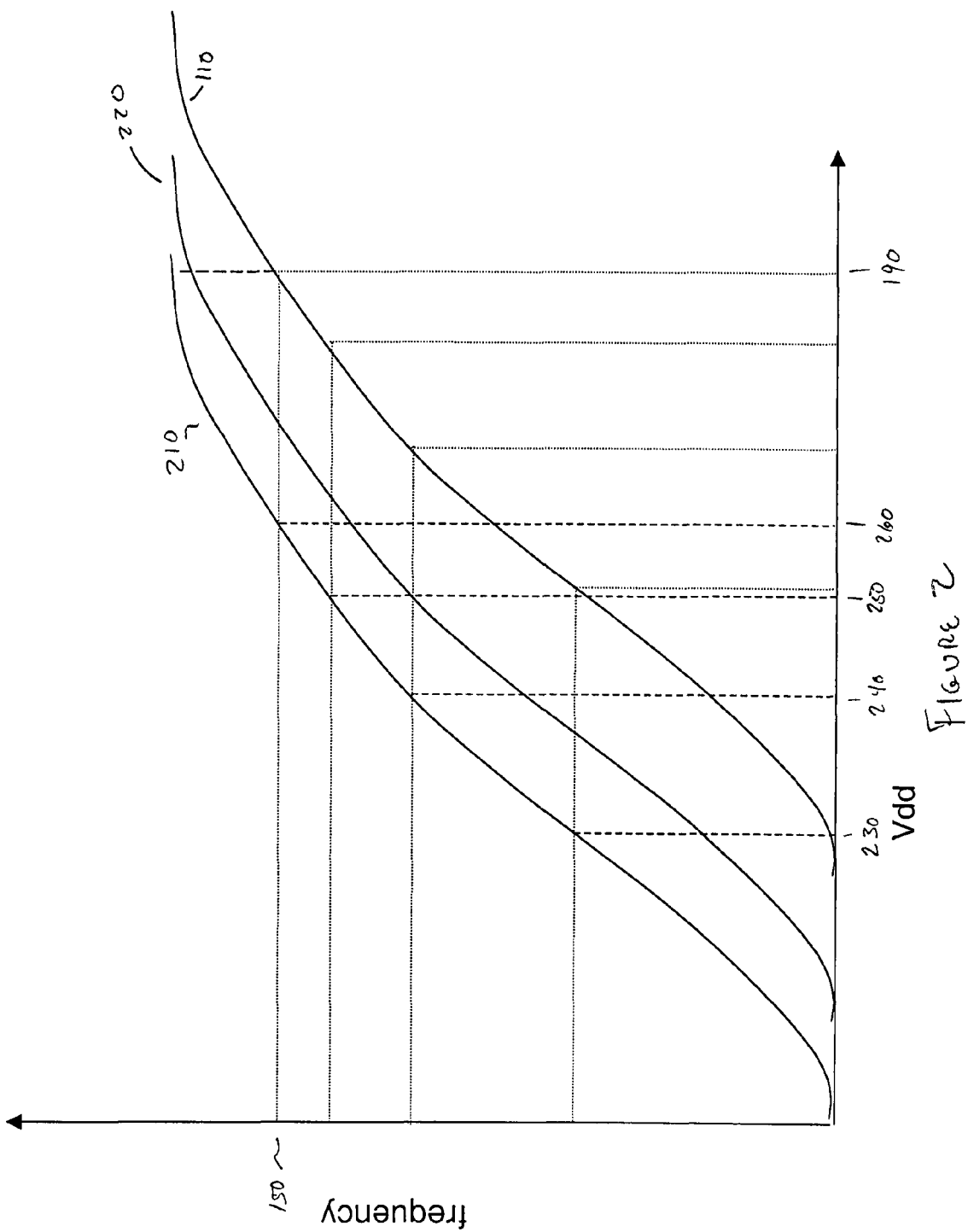
FIG. 2 illustrates exemplary frequency-voltage characteristics of specific integrated circuits, according to an embodiment of the present invention.

FIG. 2 illustrates exemplary frequency-voltage characteristics of specific integrated circuits, according to an embodiment of the present invention. Curve 210 illustrates measured frequency-voltage characteristics corresponding to a specific integrated circuit out of a manufactured population. Also shown for reference is standard frequency-voltage curve 110. It is to be appreciated that the frequency-voltage characteristic displayed in curve 210 is different from standard curve 110, reflecting variations in results of a manufacturing process.

Curve 210 represents a specific integrated circuit with frequency-voltage characteristics that are better than standard curve 110. For example, the integrated circuit represented by curve 210 is able to achieve frequency 150 at supply voltage 260, which is less than supply voltage 190, as specified by the standard frequency-voltage characteristic (Table 1). As a beneficial result, such an integrated circuit could provide the same level of processing performance (represented by frequency) at a lower voltage (e.g., voltage 260) and consequently lower power compared to operating at a standard voltage (e.g., voltage 190).

Curve 210 represents an integrated circuit with a frequency-voltage characteristic that is more desirable than the standard curve (110). Typically, a majority of a manufacturing population will have superior frequency-voltage characteristics, as a standard curve is determined, at least in part, to maximize the yield of the manufacturing process. A deleterious effect of such a standard frequency-voltage characteristic, however, is that most of the integrated circuits are capable of better power performance than they are rated.

Since performance in terms of power consumption is a critical attribute for a mobile processor, processor manufacturers typically test and certify that a part will meet a particular clock rate at a maximum power level. When operating with a fixed set of frequency-voltage operating points, such a maximum power level must be achieved at a voltage corresponding to the desired frequency where the voltage is specified by the set of frequency-voltage operating points. For example, the power level of an integrated circuit must be less than the maximum limit for frequency 150 at supply voltage 190.

"Fast" parts, for example an integrated circuit corresponding to curve 210, are able to achieve higher operating frequencies at lower voltages compared to "slower" parts. Fast parts typically also have increased current consumption at a given voltage compared to slower parts. Accordingly, while the integrated circuit corresponding to curve 210 is easily able to operate at frequency 150 at supply voltage 190, because it generally will consume more current, it may exceed the power limit at the test voltage. Deleteriously, under the conventional art, an integrated circuit corresponding to curve 210, though able to achieve a desired operating frequency, e.g., frequency 150, at a lower voltage than specified by the standard frequency-voltage characteristic, would be rejected for consuming too much power.

Testing of integrated circuits at typical operating frequencies, e.g., a few hundred megahertz into the gigahertz range, such as the testing required to generate curve 210, is generally performed after an integrated circuit has been packaged. Test fixtures required to test a packaged part are generally less expensive than test fixtures required to test at a bare die or wafer level. In addition, the packaging, including, for example a lead frame, introduces numerous additional electrical and thermal characteristics that may affect the performance, particularly the frequency performance, of a packaged device.

Unfortunately, the packaging process is expensive, in the form of packaging materials, operating expenses and capacity of process equipment. If a packaged semiconductor is found to have undesirable power characteristics after packaging, the expense of packaging is lost. In addition, certain types of non-volatile elements of a semiconductor, e.g., data storage fuses, may typically be set only prior to packaging. For example, a data storage fuse may be a semiconductor structure that is directly accessed (e.g., via laser) or via pads that are generally not bonded out. For these and other reasons it is frequently desirable to determine power performance of an integrated circuit prior to packaging.

Power consumed by CMOS circuitry is comprised of two components, a static portion and a dynamic portion. Dynamic power is given approximately by $p=CV^2f$, where C is the active switching capacitance, V is the supply voltage, and f is the frequency of operation, and static power is expressed as idle current times voltage. As described previously, it is typically not possible to accurately test an integrated circuit at frequency prior to packaging. Consequently, dynamic power may not be measured accurately prior to packaging of an integrated circuit. However, capacitance, C, and idle current are relatively unaffected by packaging and may be accurately measured at a bare die and/or wafer level.

Advantageously, given capacitance, dynamic power may be estimated prior to packaging based upon an assumed operating frequency, according to an embodiment of the present invention. For example, based upon a measured value for capacitance, dynamic power may be estimated for a desired frequency of operation. An operating voltage may be specified, for example, per a standard frequency-voltage operating point. Further, since idle current may be measured on an unpackaged device, total power (at a desired operating frequency) may be directly estimated.

According to an embodiment of the present invention, such an estimation of power consumption (for a desired operating frequency) could be used to test reject parts based upon excessive power consumption, prior to packaging. However, as previously described, a rejection based upon such criteria may deleteriously reject integrated circuit devices, e.g., the integrated circuit corresponding to curve 210 of FIG. 2.

According to an alternative embodiment of the present invention, it is more desirable to determine a maximum voltage required to achieve a maximum power limit, assuming that a desired operating frequency is achievable. For example, in the power estimation above, specify power (as a maximum limit) and solve for voltage. The resulting voltage is the maximum voltage at which the integrated circuit device may be operated at a desired frequency to achieve an acceptable power level. It is to be appreciated that the integrated circuit has not been tested at the desired frequency. However, to meet the power limit, the integrated circuit should operate at the desired frequency at a voltage equal to or less than the determined resulting voltage.

According to an embodiment of the present invention, a representation of such resulting voltage may be encoded, e.g., programmed, into a non-volatile element, e.g., a data storage fuse (e.g., a non-resettable semiconductor feature), electrically erasable programmable read only memory (EEPROM) or the like, of the integrated circuit. For example, the maximum voltage allowed may be encoded into the integrated circuit. Alternatively, a mapping into varying sets of frequency-voltage characteristics may be encoded.

Referring once again to FIG. 2, curve 220 represents a dividing line between portions of a manufacturing population, according to an embodiment of the present invention. Some integrated circuits may have a voltage frequency characteristic to the "left" of curve 220, e.g., the integrated circuit corresponding to curve 210, and some may have a voltage frequency characteristic between curve 220 and curve 110.

Based upon determining a maximum voltage allowable (so as not to exceed a maximum power level) for a desired operating frequency, specific integrated circuits may be placed into one of the above groupings. Curve 220 may become a second set of frequency-voltage operating points. With two sets of frequency-voltage operating points, represented by curves 110 and 220, integrated circuits could be operated at more optimal power levels based upon specific characteristics of a given, specific integrated circuit. For example, the integrated circuit corresponding to curve 210 could be operated at the frequency-voltage operating points of curve 220, saving power relative to operating the same integrated circuit at the standard frequency-voltage operating points of curve 110. An encoded non-volatile circuit element may determine which set of frequency-voltage operating points should be used during operation.

Table 2, below, illustrates an exemplary pair of sets of frequency-voltage operating points, according to an embodiment of the present invention.

TABLE 2

| Standard | | Fast | |
| --- | --- | --- | --- |
| Frequency | Supply Voltage | Frequency | Supply Voltage |
| 1.0 GHz | 1.50 V | 1.0 GHz | 1.40 V |
| 800 MHz | 1.30 V | 800 MHz | 1.25 V |
| 600 MHz | 1.20 V | 600 MHz | 1.10 V |
| 400 MHz | 1.05 V | 400 MHz | 1.00 V |

Table 2 illustrates two sets of frequency-voltage operating points, a standard set in the two left columns and a set for "fast" parts in the two right columns. For example, if the "fast" set of frequency-voltage operating points corresponds with curve 220, then an integrated circuit corresponding to curve 210 may be advantageously operated at frequency-voltage points in the "fast" set of Table 2. When operated according to such "fast" operating points, a "fast" integrated circuit will consume less power than when operated at a standard set of operating points.

Embodiments of the present invention are well suited to other methods of representing frequency-voltage characteristics of integrated circuits. For example, a frequency-voltage characteristic could be represented as coefficients of a polynomial describing, or approximately describing, a frequency-voltage characteristic.

Further, and in a similar fashion, such an encoded non-volatile circuit element may be used to determine a supply voltage for dynamic power testing of a packaged device. For example, fast parts, such as the integrated circuit corresponding to curve 210, should be tested at a lower supply voltage for a desired frequency, corresponding to curve 220. Whereas under the conventional art a fast part may have failed a maximum power limit test operating at a standard frequency-voltage operating point, e.g., curve 110, a higher percentage of devices will pass such a test operating at a lower voltage corresponding to curve 220. As a beneficial result, embodiments of the present invention advantageously increase the manufacturing yield.

It is to be appreciated that embodiments of the present invention are well suited to segmenting a manufacturing population into more than the illustrated two groups. More sets of frequency-voltage characteristics could be created and more bits used to identify such sets could be encoded into each specific integrated circuit.

Speed, or operating frequency for most semiconductors varies with temperature. For example, at a given voltage an integrated circuit may run faster at a lower temperature than at a higher temperature. As a corollary, an integrated circuit may typically be operated at a desired frequency with a lower supply voltage at a lower temperature when a higher supply voltage is required to operate at the same desired frequency at a higher temperature.

According to an embodiment of the present invention, chip temperature may be used to select an optimal voltage of operation for a desired operating frequency. Table 3, below, illustrates exemplary sets of frequency-voltage operating points incorporating chip temperature, according to an embodiment of the present invention.

TABLE 3

| Chip Temperature | Standard | | Fast | |
|---|---|---|---|---|
| | Frequency | Supply Voltage | Frequency | Supply Voltage |
| 100° C. "Hot" | 1.0 GHz | 1.50 V | 1.0 GHz | 1.40 V |
| | 800 MHz | 1.30 V | 800 MHz | 1.25 V |
| | 600 MHz | 1.20 V | 600 MHz | 1.10 V |
| | 400 MHz | 1.05 V | 400 MHz | 1.00 V |
| 50° C. "Cool" | 1.0 GHz | 1.40 V | 1.0 GHz | 1.30 V |
| | 800 MHz | 1.30 V | 800 MHz | 1.15 V |
| | 600 MHz | 1.10 V | 600 MHz | 1.00 V |
| | 400 MHz | 0.95 V | 400 MHz | 0.90 V |

Table 3 illustrates four sets of frequency-voltage operating points, two standard sets in the second and third columns and two sets for "fast" parts in the two right columns. There are two standard sets and two fast sets, based upon chip temperature, e.g., "hot" and "cool." If chip temperature is known to be less than or equal to 50° C., an integrated circuit may be advantageously operated at frequency-voltage points in the "cooler" or bottom portion of Table 3. When operated according to such "cool" operating points, an integrated circuit will consume less power than when operated at a standard set (that doesn't account for temperature, e.g., Table 2) of operating points.

It is to be appreciated that embodiments of the present invention are well suited to characterizing frequency-voltage characteristics into more than the illustrated two temperature groups. More sets of temperature dependent frequency-voltage characteristics could be created and more bits used to identify such sets could be encoded into each specific integrated circuit.

While encoding a mapping into varying sets of frequency-voltage characteristics into an integrated circuit is sometimes desirable, there are limitations as well. A first limitation relates to the amount of information that may actually be encoded into an integrated circuit. Microprocessors typically have extremely limited amounts of or no non-volatile storage. The reasons for a paucity of such on-chip non-volatile storage include circuit size, e.g., a bit of non-volatile storage consumes valuable circuit area, more optimally used for microprocessor circuitry. Another reason relates to semiconductor processes, e.g., many types of integrated circuit non-volatile storage require additional semiconductor masks and process steps not required for standard microprocessor circuitry. Such masks and process steps are expensive and add complexity to a manufacturing process, thereby increasing costs and reducing yield. For these reasons and others, non-volatile storage requiring additional process steps is typically not included in a microprocessor.

A second limitation involves the capacity and capabilities of die/wafer level testing. Die and wafer level testers are expensive, more so than packaged testers, and as previously described typically can not fully characterize the frequency-voltage behavior of an integrated circuit because of the electrical effects of packaging. Consequently, it is sometimes more desirable to characterize the frequency-voltage behavior of an integrated circuit after packaging.

It is to be appreciated that embodiments of the present invention are well suited to encoding a mapping into varying sets of frequency-voltage characteristics into an integrated circuit after packaging. For example, on-chip non-volatile storage may be accessible via package pins, and a tester could write mapping information into such storage. However, it will frequently be the case that on-chip non-volatile storage may not be encoded after packaging. At other times there may not be sufficient on-chip non-volatile storage available for encoding the desired amount of information.

In such cases, alternative means of associating one or more frequency-voltage characteristics with a specific integrated circuit should be employed.

According to an embodiment of the present invention, a frequency-voltage characteristic, or a mapping of a frequency-voltage characteristic, of a specific integrated circuit may be encoded in a non-volatile memory device that is associated with the specific integrated circuit. Example devices include without limitation electrically erasable programmable read only memory (EEPROM), battery-backed up random access memory (RAM), mask ROM, ferro-magnetic RAM, data storage fuses within semiconductor packaging, data storage fuses that are a part of an integrated circuit, wiring connections (e.g., encoding by coupling pins to Vcc and/or ground), and the like.

One desirable method of associating a non-volatile memory device with specific integrated circuit is to include a memory device in the packaging of the specific integrated circuit, for example in a multi-chip module.

Embodiments of the present invention are well suited to other methods of associating a frequency-voltage characteristic, or a mapping of a frequency-voltage characteristic, of a specific integrated circuit with the specific integrated circuit. One method maintains a database in computer readable media of a plurality of frequency-voltage characteristics for a plurality of integrated circuits. A specific frequency-voltage characteristic of a specific integrated circuit may then be referenced by an identifying attribute of the integrated circuit, e.g., a unique serial number.

The specific frequency-voltage characteristic may then be transferred by a wide variety of means, e.g., internet download, and referenced at many points during the manufacture and/or use of products using the integrated circuit. For example, if the integrated circuit was a microprocessor, the manufacturer of a computer comprising the microprocessor could assemble the computer, electronically access the microprocessor serial number, access the specific frequency-voltage characteristic, e.g., in a data file, and configure a unique ROM for that computer. Such a ROM would then reflect the specific frequency-voltage characteristic of the microprocessor at the heart of that particular computer.

Encoding information after a packaging operation typically makes a greater amount of storage available that pre-packaging encoding. For example, a memory semiconductor typically comprises millions of bits of information as opposed to a few bits which might be included in a microprocessor. In addition, numerous types of well known computer systems that may be coupled to a microprocessor, e.g., testing machines, may have, or be further coupled to essentially unlimited storage.

Further, since an integrated circuit may be fully characterized after packaging, it is typically possible to encode greater amounts of information specific to a particular integrated circuit after packaging. According to an embodiment of the present invention, information of specific integrated circuit frequency-voltage characteristics may be encoded after packaging the integrated circuit.

Such post packaging encoding may store a variety of types of information. For example, an integrated circuit may be characterized as belonging to one of a plurality of groups of integrated circuits which have similar frequency-voltage characteristics. Information encoded may identify which of such groups best describes a specific integrated circuit.

Alternatively, a frequency-voltage characteristic of a specific integrated circuit may be encoded. For example, attributes of curve 210 (FIG. 2) may be encoded. In this manner, a single set of frequency-voltage characteristics may be utilized by power management software operating on a specific integrated circuit. Advantageously, such a single set of characteristics reduces storage requirements relative to storing multiple sets. In addition, power management software may be simplified and operate more efficiently with reduced indirection in referencing a single set of operating points.

Embodiments of the present invention are well suited to a wide variety of well known methods of representing curves, including data reduction techniques, such as a frequency-voltage curve of an integrated circuit. According to one embodiment of the present invention, tables containing coordinate points are used to represent frequency-voltage characteristics. According to an alternative embodiment, a frequency-voltage characteristic may be represented as coefficients of a polynomial describing, or approximately describing, a frequency-voltage characteristic.

Table 4, below, illustrates a frequency-voltage characteristic of a specific microprocessor, according to an embodiment of the present invention.

TABLE 4

| Chip Temperature | Operating Point | |
|---|---|---|
| | Frequency | Supply Voltage |
| 100° C. "Hot" | 1.0 GHz | 1.50 V |
| | 800 MHz | 1.30 V |
| | 600 MHz | 1.20 V |
| | 400 MHz | 1.05 V |
| 50° C. "Cool" | 1.0 GHz | 1.40 V |
| | 800 MHz | 1.30 V |
| | 600 MHz | 1.10 V |
| | 400 MHz | 0.95 V |

It is to be appreciated that only one set of voltage-frequency characteristics (optionally per temperature) is included in Table 4.

Figure 3:
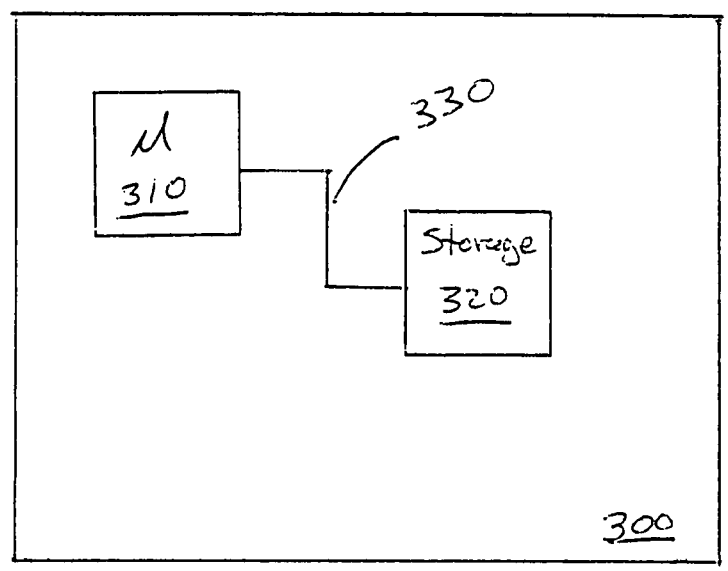
FIG. 3 illustrates an integrated circuit module, according to an embodiment of the present invention.

FIG. 3 illustrates an integrated circuit module 300, according to an embodiment of the present invention. Module 300 comprises a microprocessor 310 and a non-volatile storage 320. Microprocessor 310 and storage 320 are coupled by coupling 330. Module 300 generally conforms to a wide variety of types of integrated circuit packaging, e.g., a package designed for direct or indirect mounting on a printed circuit board. Example packages include without limitation ball grid arrays, pin grid arrays, thin quad flat packs, leadless chip carriers and the like. Module 300 may be a multi-chip module, capable of containing a plurality of integrated circuits. In one example, the processor 310 and storage device 320 are separate integrated circuits.

Embodiments of the present invention are also well suited to modules comprising a microprocessor which is directly attached to a circuit board, e.g., via direct chip attach (DCA). Integrated circuits which are DCA-mounted typically have an encapsulant or "glop top" applied after mounting, although this is not required by embodiments of the present invention. No requirement of physical proximity of components of a module is intended by the foregoing discussion.

Non-volatile storage 320 is well suited to a wide variety of types of non-volatile storage. For example, storage 320 may be an integrated circuit device, including without limitation electrically erasable programmable read only memory (EEPROM), battery-backed up random access memory (RAM), mask ROM, and ferro-magnetic RAM. Storage 320 is also well suited to a wide variety of other types of data storage, including data storage fuses within semiconductor packaging, data storage fuses that are a part of an integrated circuit, wiring connections (e.g., encoding by coupling pins to Vcc and/or ground), and the like.

Figure 4:
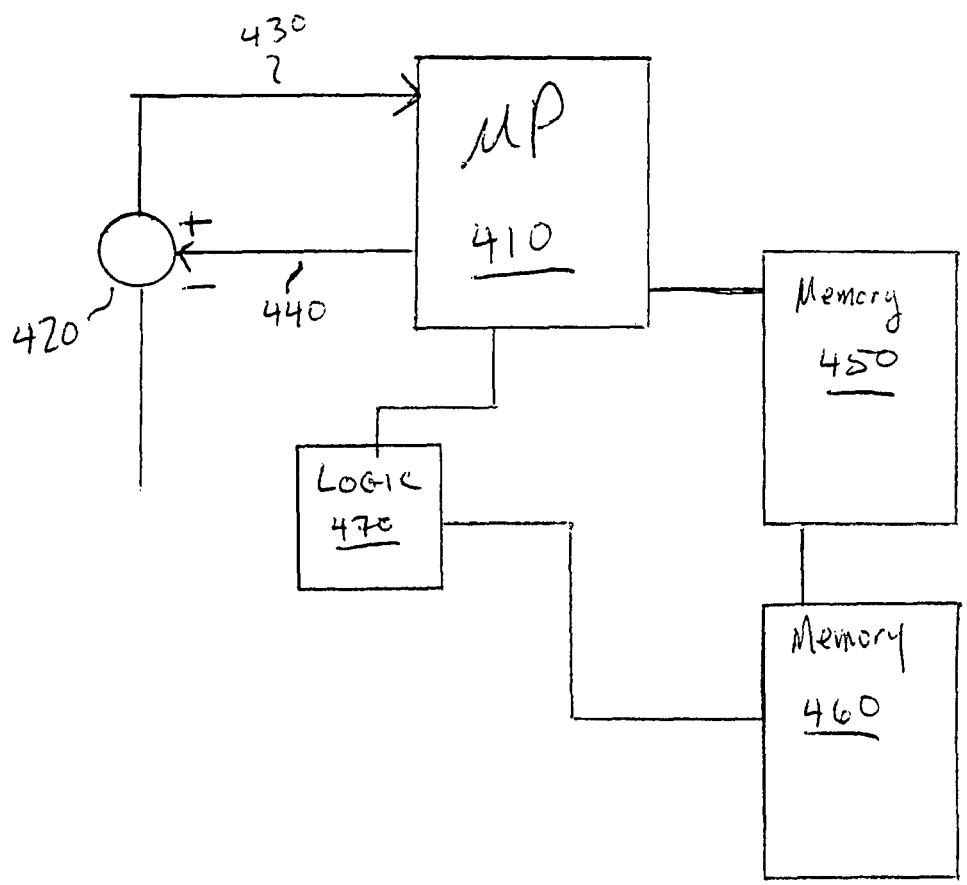
FIG. 4 illustrates a device according to an embodiment of the present invention.

FIG. 4 illustrates a device 400, according to an embodiment of the present invention. Device 400 may form a computer, or portions thereof, e.g., a computer motherboard. Device 400 comprises a microprocessor 410 and a memory space 450. Microprocessor 410 is capable of operating at a plurality of voltages and further capable of operating at a plurality of frequencies.

Memory space 450 is coupled to microprocessor 410. Memory space 450 is well suited to a wide variety of well known types of memory, including without limitation internal RAM or ROM within microprocessor 410, RAM or ROM outside of microprocessor 410 and other forms of computer readable media.

Voltage supply 420 is coupled to microprocessor 410. Voltage supply 420 furnishes a selectable voltage 430 to microprocessor 410. Microprocessor 410 is coupled to voltage supply 420 via coupling 440, in order to cause voltage supply 420 to select an optimal voltage.

According to an alternative embodiment of the present invention, device 400 may further comprise memory space 460. Memory space 460 is coupled to microprocessor 410, for example via the same coupling means as memory space 450. Memory space 460 is well suited to similar types of memory as previously described for memory 450, and is further well suited to being within the same physical device as memory space 450. However, memory space 460 is not required to be in the same physical device as memory space 450, and some optimizations of computer 400 may preferentially separate the two memories by type and/or device.

According to another alternative embodiment of the present invention, device 400 may comprise logic 470. Logic 470 is coupled to memory 460 and microprocessor 410. Logic 470 accesses a desired frequency of operation, which may be determined by microprocessor 410, and uses memory 460 to determine a corresponding voltage. Logic 470 causes microprocessor 410 to operate at the desired frequency of operation and at the corresponding voltage. Logic 470 is well suited to software embodiments executing, for example, on microprocessor 410. Logic 470 may also execute on a second processor (not shown), or comprise a functional set of gates and/or latches. Logic 470 is well suited to being internal or external to microprocessor 410.

Figure 5A:
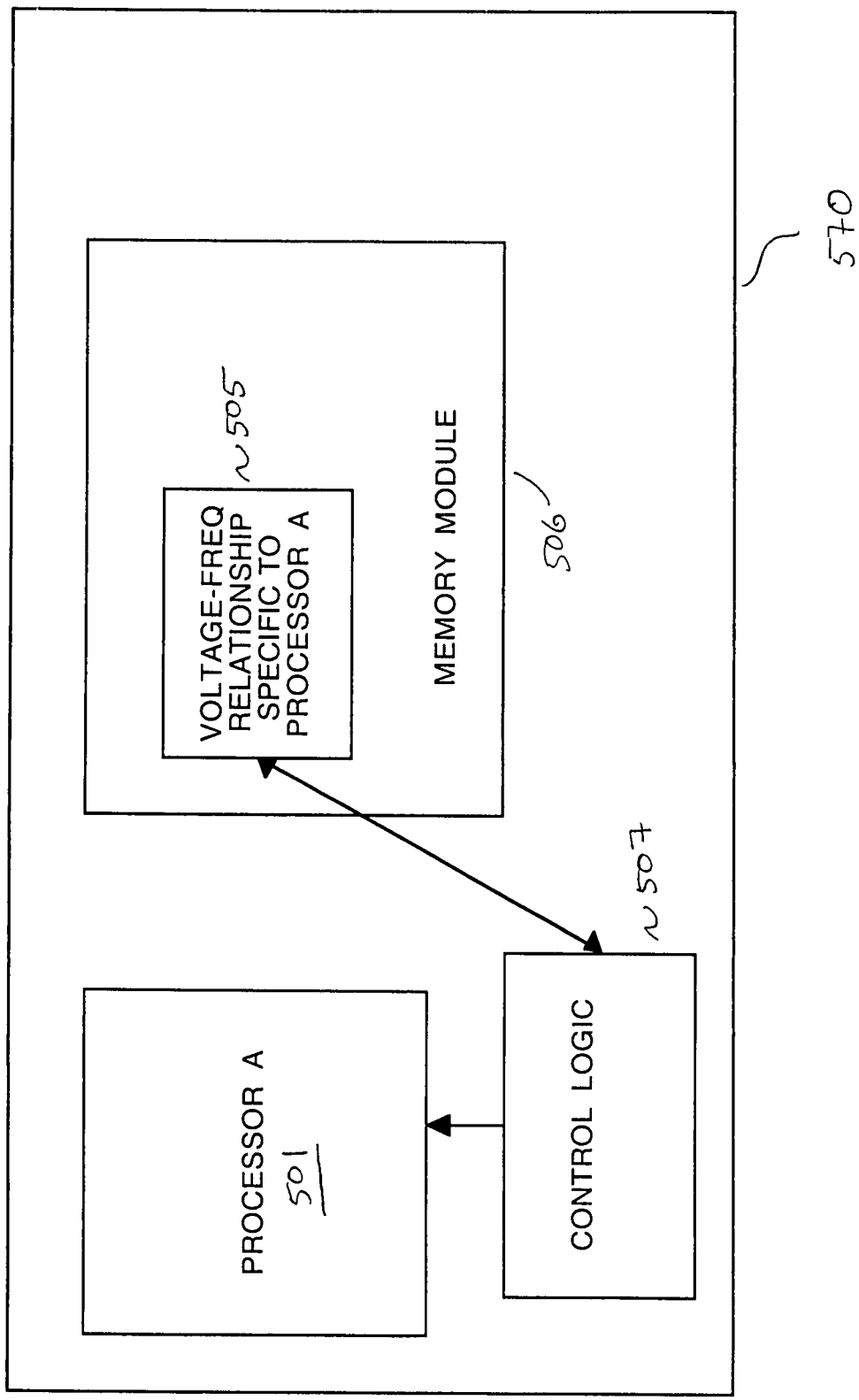
FIGS. 5A, 5B and 5C illustrate configurations of computing elements, according to embodiments of the present invention.
Figure 5B:
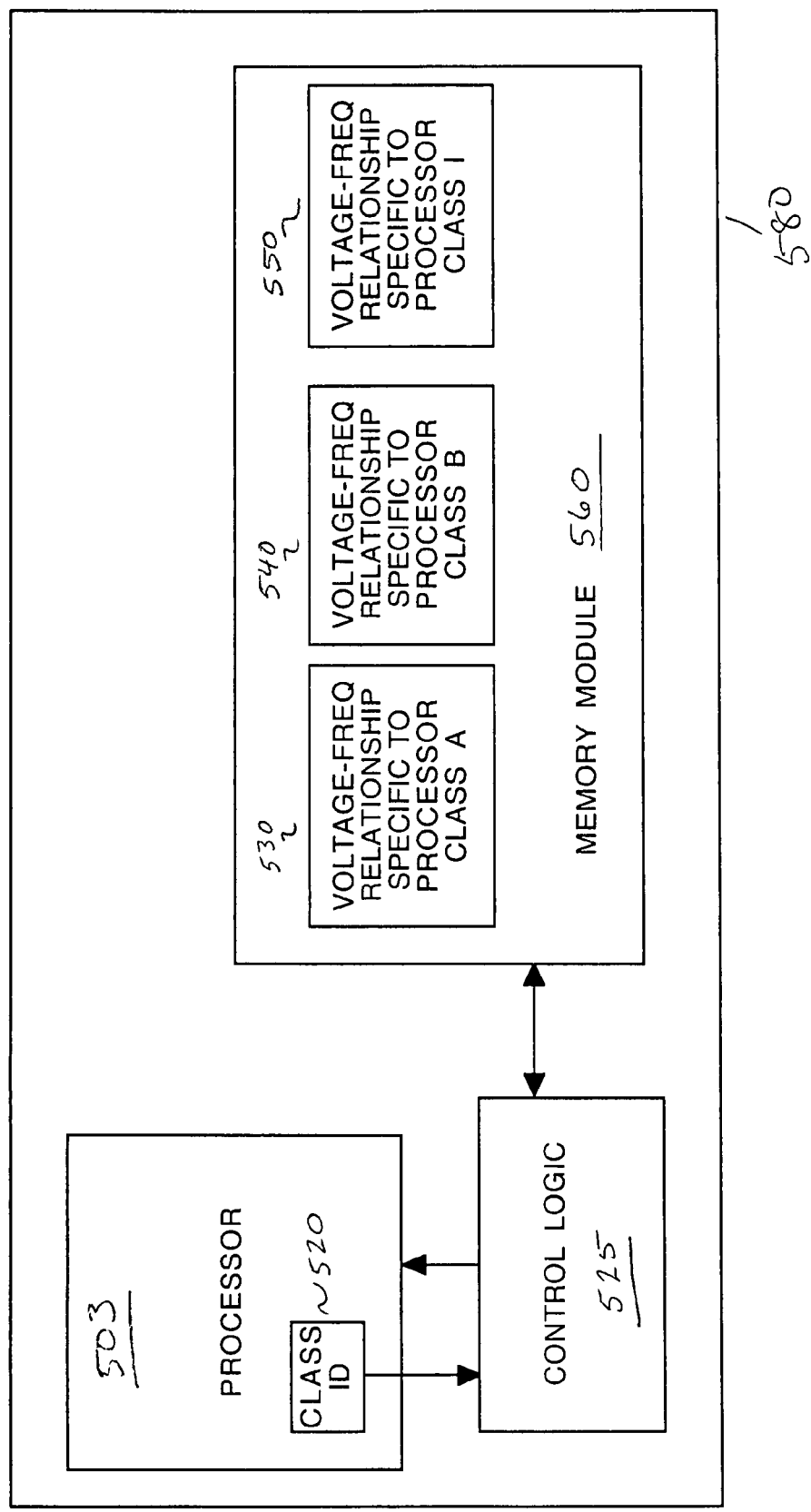
Figure 5C:
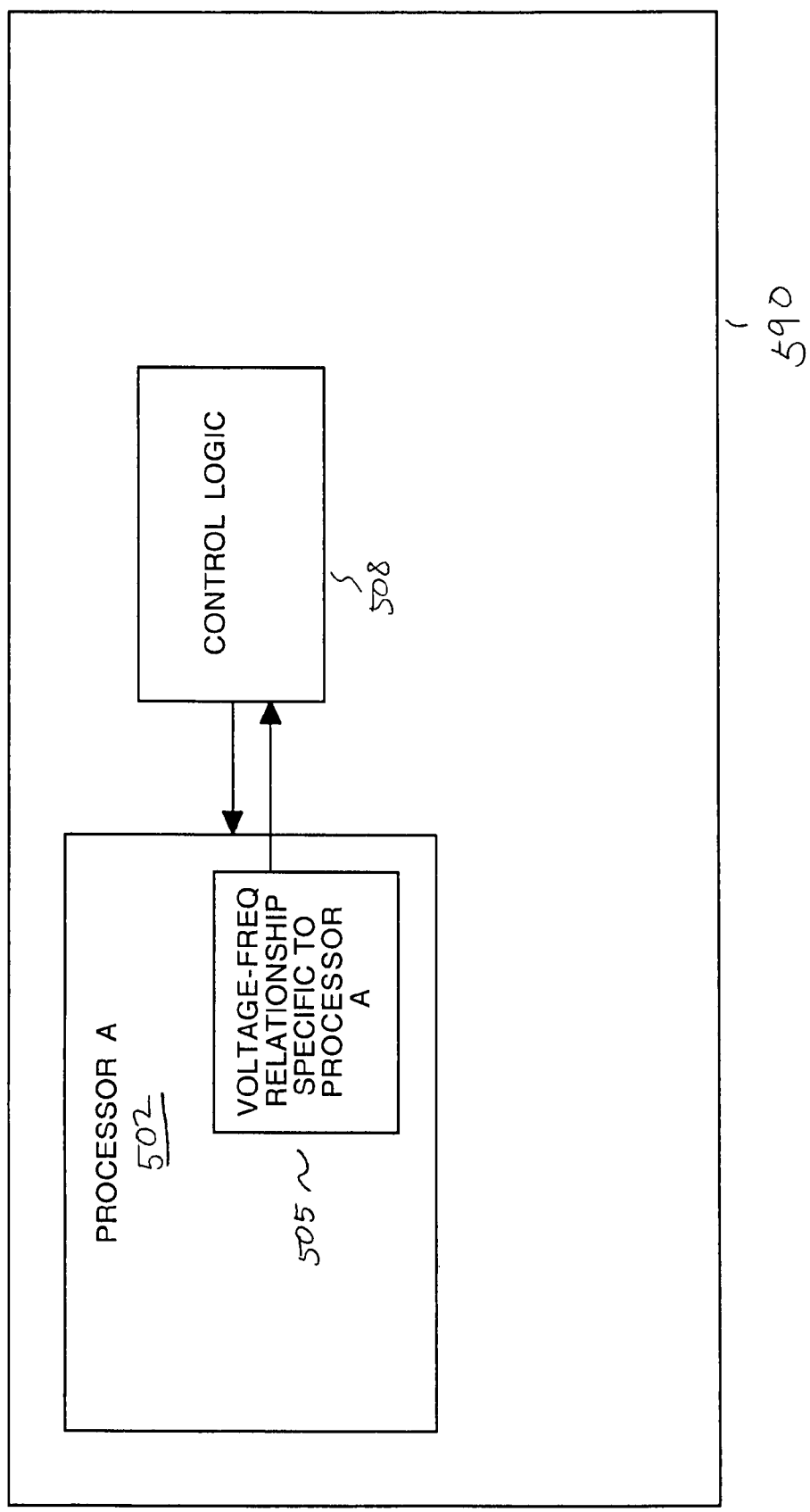

FIGS. 5A, 5B and 5C illustrate configurations of computing elements, according to embodiments of the present invention. FIG. 5A illustrates configuration 570 of computing elements, according to an embodiment of the present invention. Configuration 570 is well suited to a wide variety of placing, mounting and interconnection arrangements. For example, configuration 570 may be a portion of a computer "mother board." Alternatively, configuration 570 may be a multi-chip module.

Data structure 505 comprises voltage-frequency relationship information specific to processor 501. In contrast to the conventional art, information of data structure 505 is based upon testing of processor 501, as opposed to being information generally about a population of processors of similar design. Data structure 505 may reside in memory 506, which is external to processor 501. Memory 506 may be, for example, a ROM integrated circuit. Embodiments of the present invention are well suite to other types of memory as well, e.g., RAM, rotating magnetic storage, etc.

Control logic 507 uses information from data structure 505 to control the voltage and/or frequency of operation for processor 501. Such control may be to minimize power consumption of processor 501. Control logic 507 is well suited to software executing on processor 501.

FIG. 5B illustrates configuration 580 of computing elements, according to an embodiment of the present invention. Configuration 580 is well suited to a wide variety of placing, mounting and interconnection arrangements. For example, configuration 580 may be a portion of a computer "mother board." Alternatively, configuration 580 may be a multi-chip module.

Data structure 530 comprises voltage-frequency relationship information for a class of processors of the type of processor 503. Likewise, data structures 540 and 550 comprises voltage-frequency relationship information respectively for other classes of processors of the type of processor 503. In contrast to the conventional art, information of data structures 530-550 represents, segments of a manufacturing population of processors of the same type as processor 503. Typically, information 530, 540 and 550 will differ. Embodiments of the present invention are well suited to varying numbers of such data structures. Data structures 530, 540 and 550 may reside in memory 560, which is external to processor 503. Memory 560 may be, for example, a ROM integrated circuit. Embodiments of the present invention are well suite to other types of memory as well, e.g., RAM, rotating magnetic storage, etc.

Class identifier 520 comprises information as to which voltage-frequency relationship (e.g., contained in data structure 530, 540 or 550) best corresponds to processor 503. Class identifier 520 is determined and recorded during production of processor 503. Such determination and recording of a class identifier may be performed prior to packaging of processor 503. Class identifier 520 is typically a few bits, and is well suited to many types of non-volatile storage, e.g., data storage fuses or electrically erasable programmable read only memory (EEPROM).

Control logic 525 accesses information from class identifier 520 to determine which data structure, e.g., 530, 540 or 560, corresponds to processor 503 and should be used to control the voltage and/or frequency of operation for processor 503. Such control may be to minimize power consumption of processor 503. Control logic 525 is well suited to software executing on processor 503.

FIG. 5C illustrates configuration 590 of computing elements, according to an embodiment of the present invention. Configuration 590 is well suited to a wide variety of placing, mounting and interconnection arrangements. For example, configuration 590 may be a portion of a computer "mother board." Alternatively, configuration 590 may be a multi-chip module.

Data structure 505 comprises voltage-frequency relationship information specific to processor 502. In contrast to the conventional art, information of data structure 505 is based upon testing of processor 502, as opposed to being information generally about a population of processors of similar design. Data structure 505 is internal to processor 502. Data structure 505 may be stored in a wide variety of well known memory types are may be included in a processor, e.g., non-volatile RAM, electrically erasable programmable read only memory (EEPROM), etc.

Control logic 508 uses information from data structure 505 to control the voltage and/or frequency of operation for processor 502. Such control may be to minimize power consumption of processor 502. Control logic 508 is well suited to software executing on processor 502.

Figure 6:
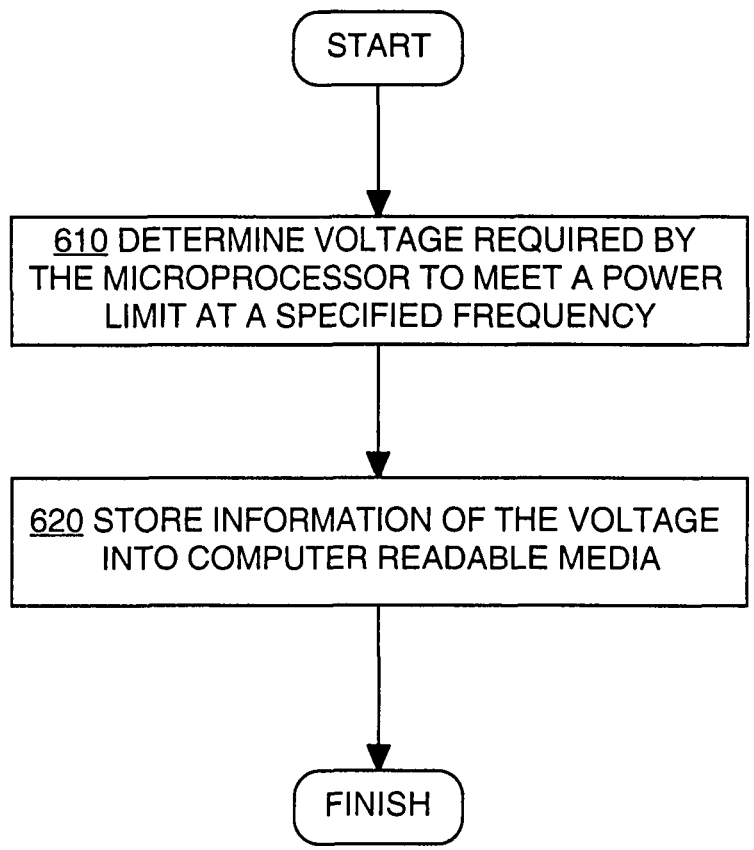
FIG. 6 illustrates a method of manufacturing a microprocessor, according to an embodiment of the present invention.

FIG. 6 illustrates a method 600 of manufacturing a microprocessor, according to an embodiment of the present invention. In step 610, a voltage required by the microprocessor to meet a power limit at a specified frequency is determined. The voltage may be determined by operating the microprocessor at the specified frequency and measuring its power consumption, for example.

In step 620, information of the voltage is stored into computer readable media. Embodiments of the present invention are well suited to storing the information in a wide variety of types of computer readable media, including memory or storage systems of an integrated circuit tester or manufacturing data logging systems, integrated circuits within common packaging of the microprocessor, separate integrated circuit memories and the like. According to an embodiment of the present invention, the information comprises frequency voltage relations specific to the microprocessor.

Figure 7:
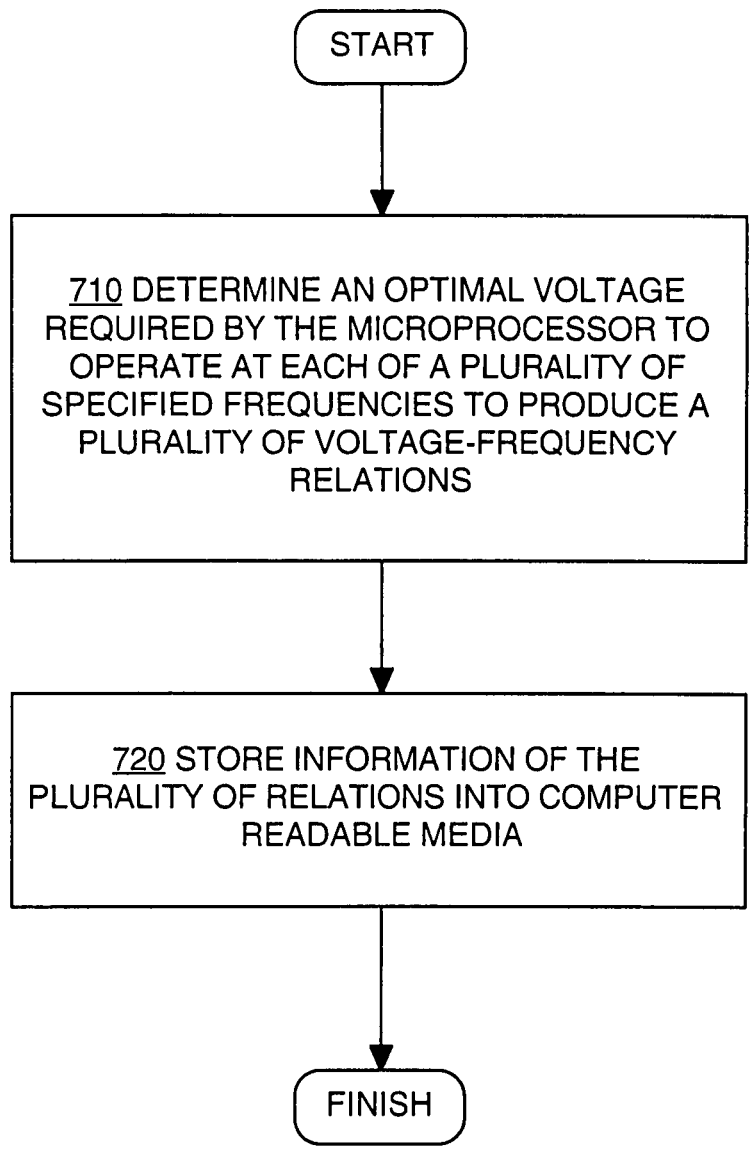
FIG. 7 illustrates a method of manufacturing a microprocessor, according to an embodiment of the present invention.

FIG. 7 illustrates a method 700 of manufacturing a microprocessor, according to an embodiment of the present invention. In step 710, an optimal voltage required by the microprocessor to operate at each of a plurality of specified frequencies is determined, producing a plurality of voltage-frequency relations. The voltage frequency relations may be similar to Table 4, above.

In step 720, information of the plurality of relations is stored into computer readable media. Embodiments of the present invention are well suited to storing the information in a wide variety of types of computer readable media, including memory or storage systems of an integrated circuit tester or manufacturing data logging systems, integrated circuits within common packaging of the microprocessor, separate integrated circuit memories and the like.

Figure 8:
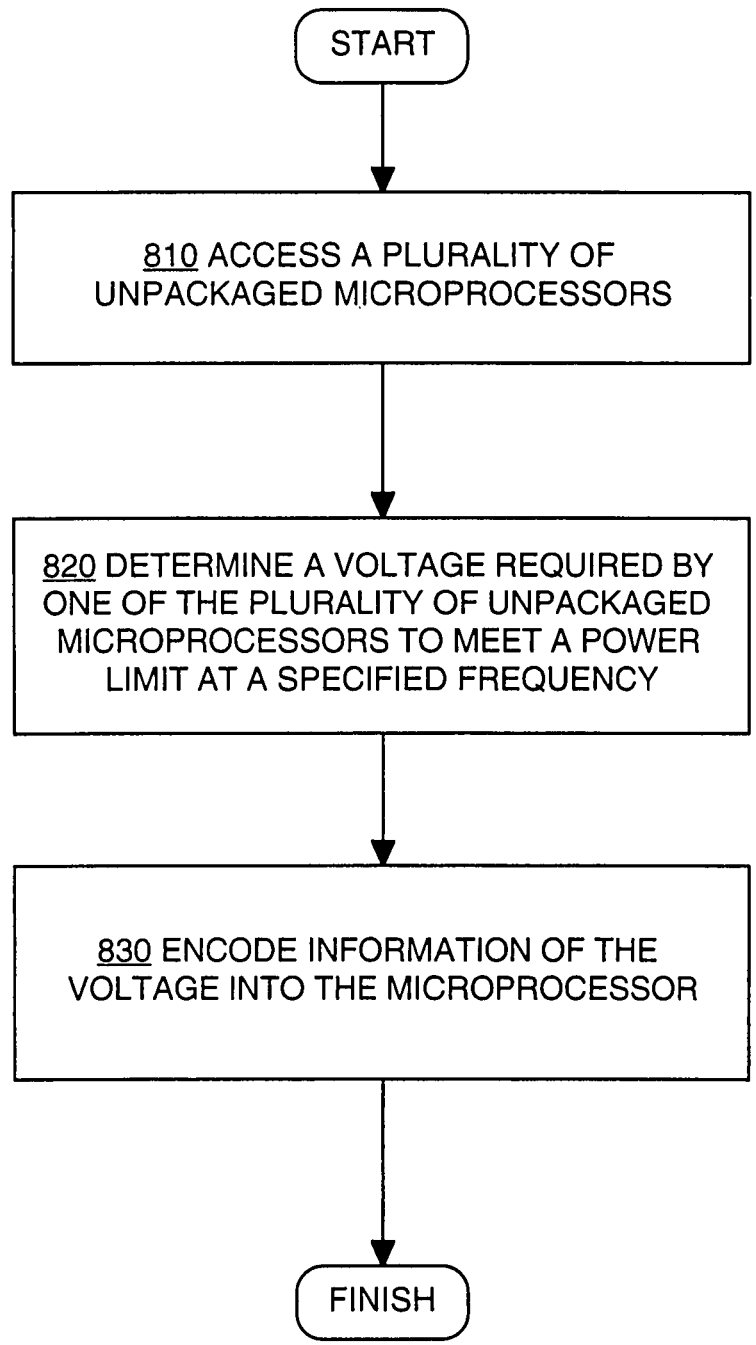
FIG. 8 illustrates a method of manufacturing a microprocessor, according to an embodiment of the present invention.

FIG. 8 illustrates a method 800 of manufacturing a microprocessor, according to an embodiment of the present invention. In step 810, a plurality of unpackaged microprocessors is accessed. It is appreciated that "packaging" and like terms refer to semiconductor packaging, e.g., a pin grid array package, rather than shipping or consumer packaging. The microprocessors may be in wafer form.

In step 820, a voltage required by one of the plurality of unpackaged microprocessors to meet a power limit at a specified frequency is determined. The voltage may be determined by measuring capacitance and/or idle current of the microprocessor.

In step 830, information of said voltage is encoded into the microprocessor. Embodiments of the present invention are well suited to a wide variety of well known types of storage that may be a part of a microprocessor and encoded in step 830. Examples include, without limitation, data storage fuses and electrically erasable read only memory and the like.

Figure 9:
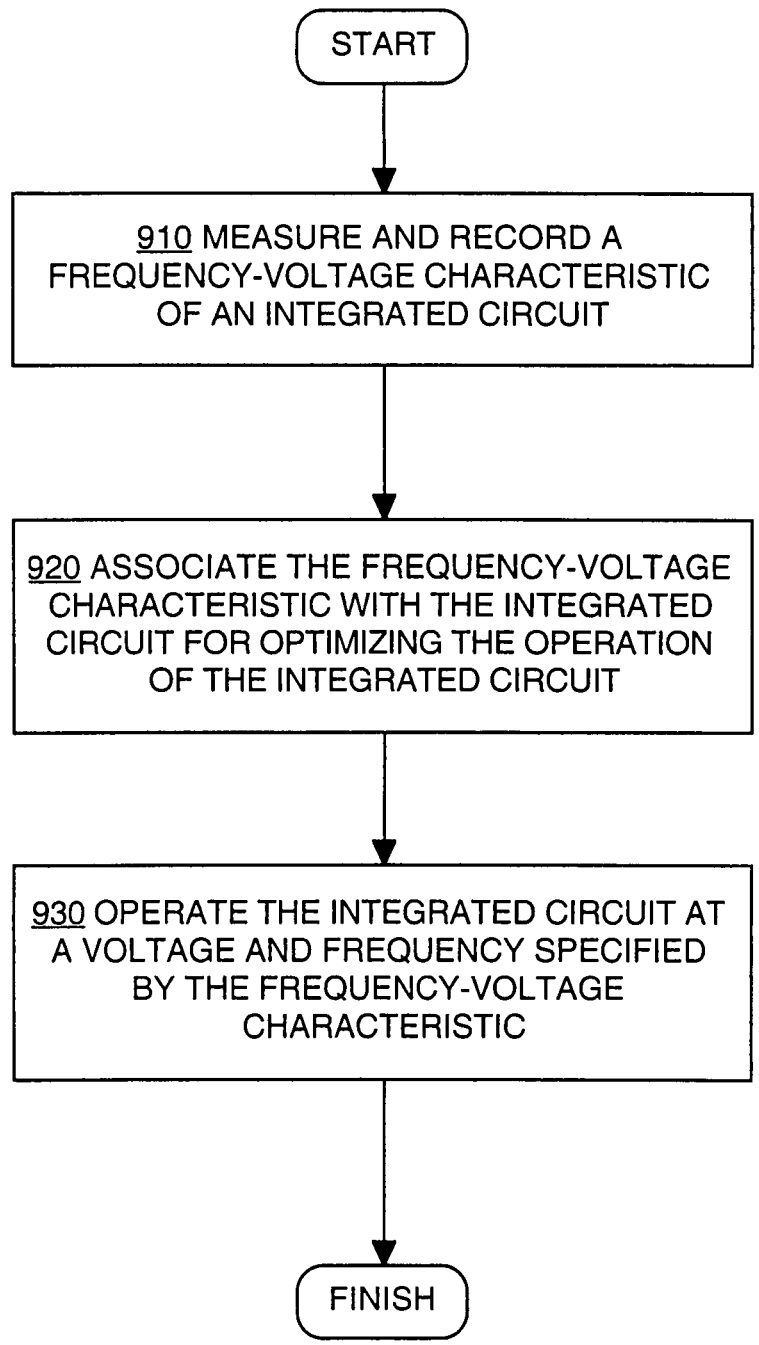
FIG. 9 illustrates a method of operating an integrated circuit, according to an embodiment of the present invention.

FIG. 9 illustrates a method 900 of operating an integrated circuit, according to an embodiment of the present invention. In step 910, a frequency-voltage characteristic of an integrated circuit is measured and recorded. The integrated circuit may be a microprocessor, and the integrated circuit may be packaged or unpackaged.

In step 920, the frequency-voltage characteristic is associated with the integrated circuit for optimizing the operation of the integrated circuit. The frequency-voltage characteristic may be associated with the integrated circuit in a wide variety of ways, including via encoding information in the integrated circuit or encoding information in a device that will be delivered to a customer with the integrated circuit. According to an alternative embodiment of the present invention, associating may take the form of maintaining a database in computer readable media of a plurality of frequency-voltage characteristics for a plurality of integrated circuits. A specific frequency-voltage characteristic of a specific integrated circuit may then be referenced by an identifying attribute of the integrated circuit, e.g., a unique serial number.

In step 930, the integrated circuit is operated at a voltage and frequency specified by the frequency-voltage characteristic.

Figure 10:
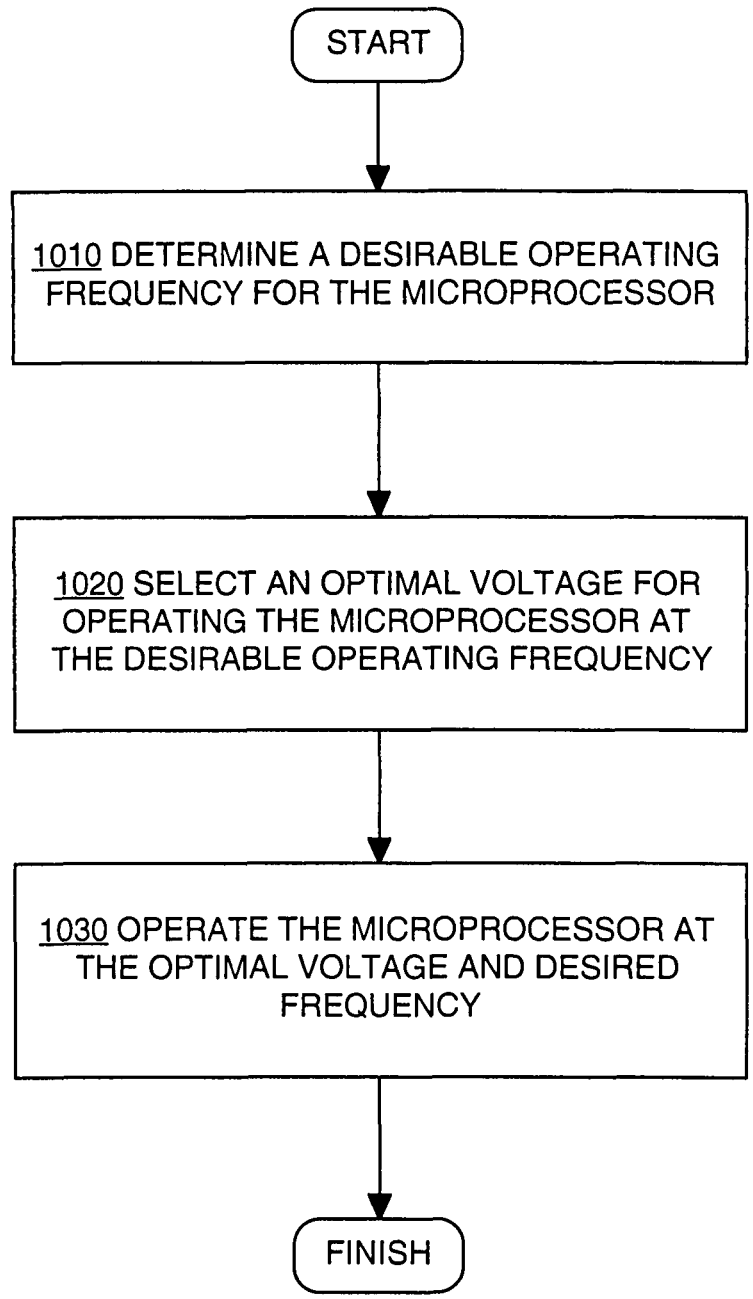
FIG. 10 illustrates a method of operating a microprocessor, according to an embodiment of the present invention.

FIG. 10 illustrates a method 1000 of operating a microprocessor, according to an embodiment of the present invention. In step 1010, a desirable operating frequency is determined for the microprocessor. One typical means of determining a desirable frequency is based upon the processing needs of software executing on the microprocessor.

In step 1020, an optimal voltage for operating the microprocessor at the desirable operating frequency is selected. The optimal voltage selected is based upon characteristics that are specific for the microprocessor.

In step 1030, the microprocessor is operated at the optimal voltage. For example, the microprocessor may cause a selectable voltage supply, e.g., voltage supply 420 of FIG. 4, to output the optimal voltage. According to an alternative embodiment of the present invention, the microprocessor may be operated at the desirable frequency while operating at the optimal voltage.

Figure 11:
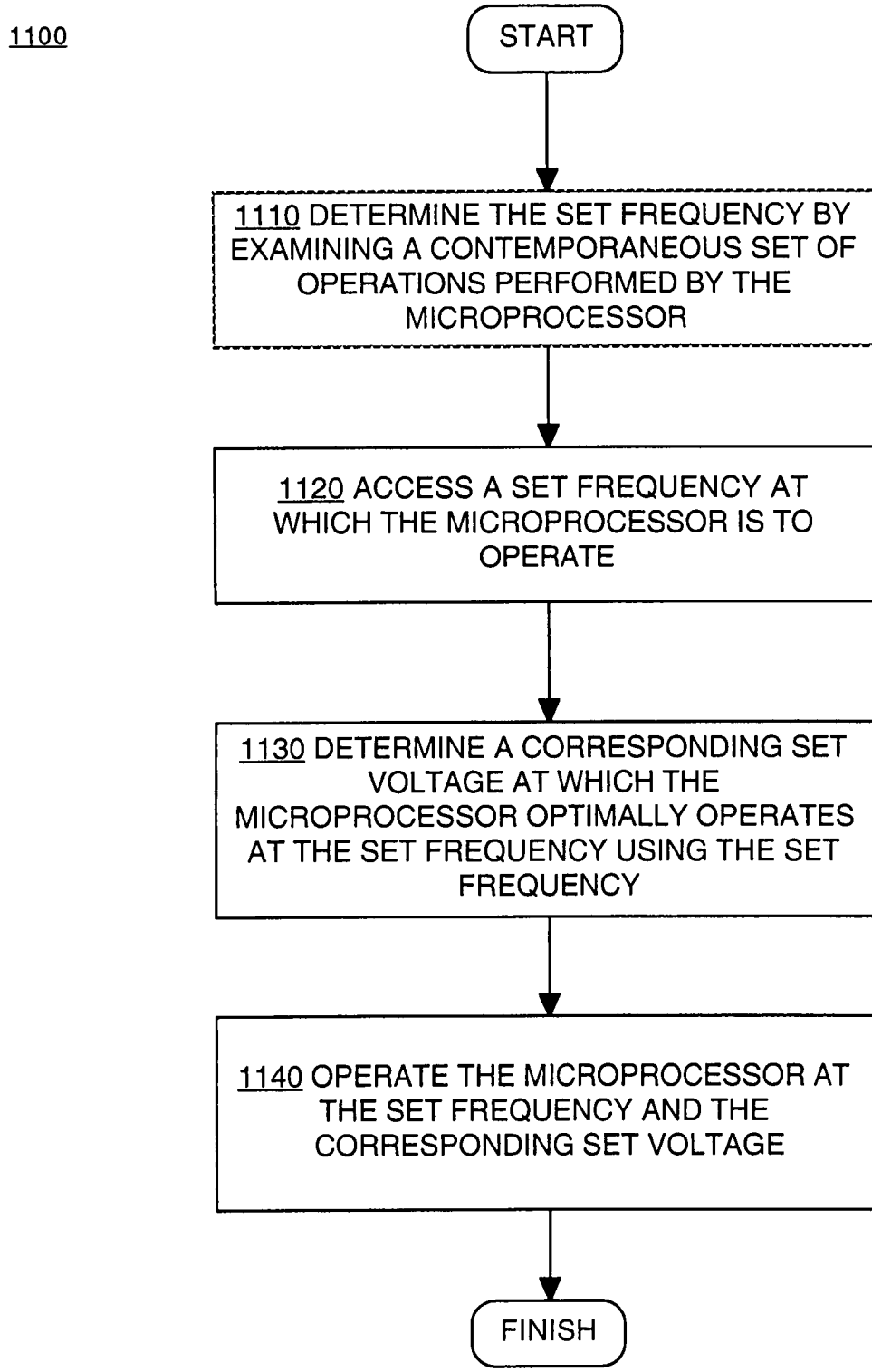
FIG. 11 illustrates a method of operating a microprocessor, according to an embodiment of the present invention.

FIG. 11 illustrates a method 1100 of operating a microprocessor, according to an embodiment of the present invention. In step 1120, a set frequency at which the microprocessor is to operate is accessed.

In step 1130, a corresponding set voltage at which the microprocessor optimally operates at the set frequency is determined using the set frequency. The determining is based on a voltage-frequency relationship that is specific to the microprocessor.

In step 1140, the microprocessor is operated at the set frequency and the corresponding set voltage.

In optional step 1110, the set frequency is determined by examining a contemporaneous set of operations performed by the microprocessor.

Figure 12:
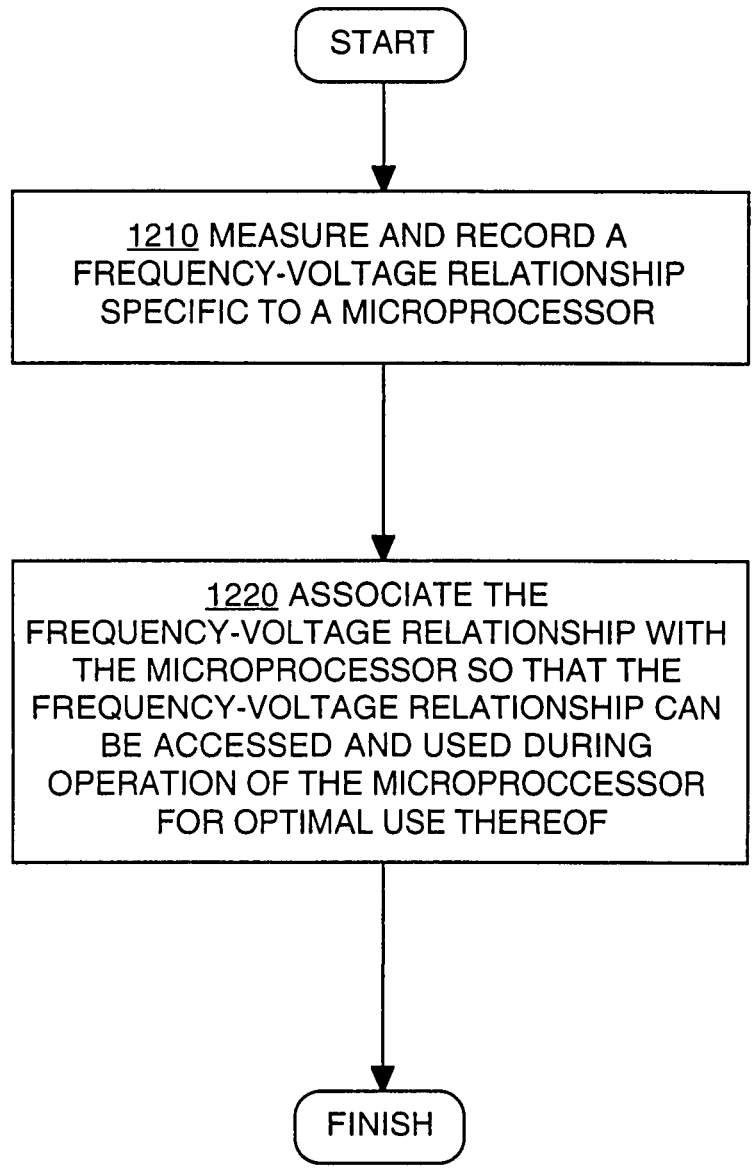
FIG. 12 illustrates a method of characterizing a microprocessor, according to an embodiment of the present invention.

FIG. 12 illustrates a method 1200 of characterizing a microprocessor, according to an embodiment of the present invention. In step 1210, a frequency-voltage relationship specific to a microprocessor is measured and recorded. The frequency-voltage relationship may record frequency-voltage pairs for optimal operation of the microprocessor. Embodiments of the present invention are well suited to other well known methods of recording a relationship, including various well known data reduction methods.

In step 1220, the frequency-voltage relationship is associated with the microprocessor so that said frequency-voltage relationship can be accessed and used during operation of the microprocessor for optimal use thereof.

Figure 13:
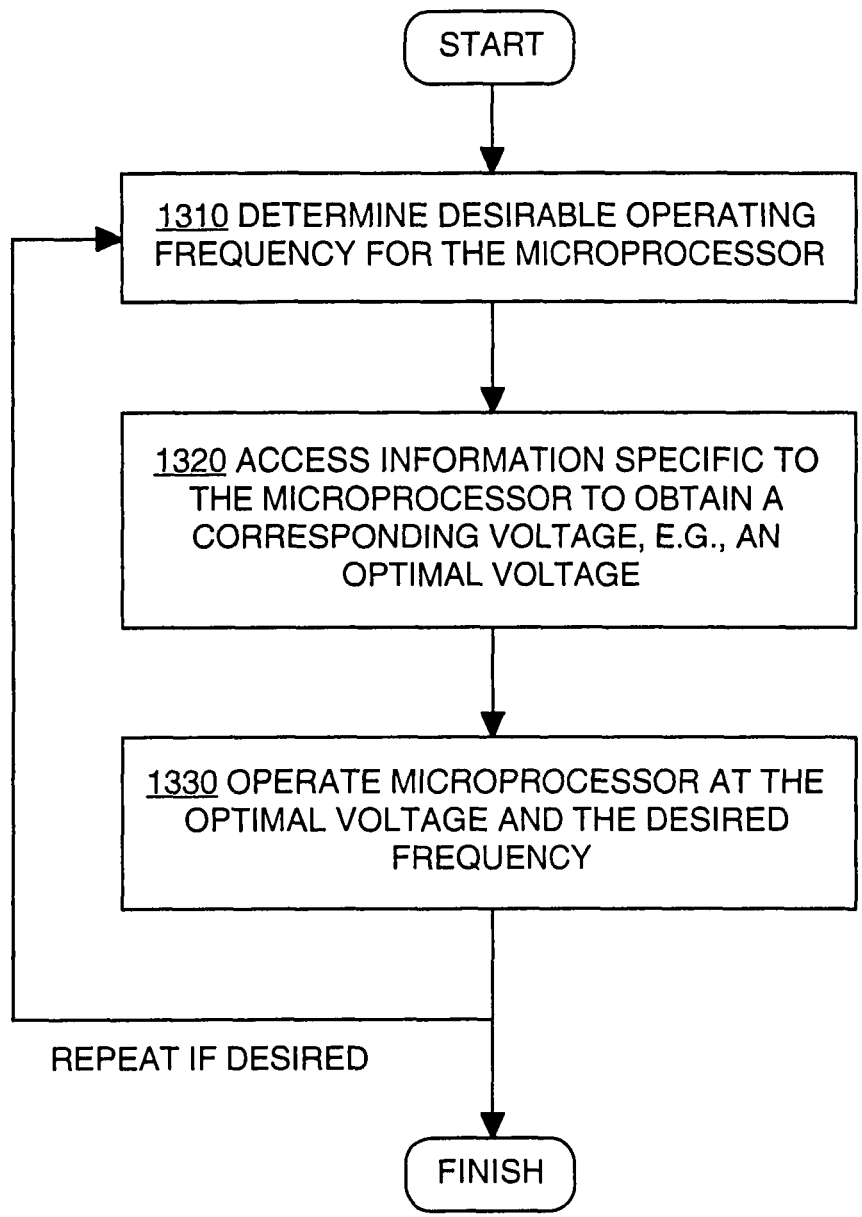
FIG. 13 illustrates a method of operating a microprocessor, according to an embodiment of the present invention.

FIG. 13 illustrates a method 1300 of operating a microprocessor, according to an embodiment of the present invention. In step 1310, a desirable operating frequency is determined for the microprocessor. Embodiments of the present invention are well suited to a variety of optimizations to determine a desirable frequency. One typical means of determining a desirable frequency is based upon the processing needs of software executing on the microprocessor.

In step 1320, information specific to the microprocessor is accessed. For example, the information may be stored in memory, e.g., memory 450 of FIG. 4. The information is used to determine an optimal voltage for operating the microprocessor at the desirable frequency. The optimal voltage is based upon characteristics of the microprocessor.

According to an alternative embodiment of the present invention, the information may be accessed from within the microprocessor.

In step 1330, the microprocessor is operated at the optimal voltage. For example, the microprocessor may cause a selectable voltage supply, e.g., voltage supply 420 of FIG. 4, to output the optimal voltage. According to an alternative embodiment of the present invention, the microprocessor may be operated at the desirable frequency while operating at the optimal voltage. Steps 1310 through 1330 may be repeated, if desired. For example, if a processing load changes, a new desirable operating frequency may be determined, a corresponding voltage may be accessed, and the microprocessor may be operated at the new frequency and voltage.

A system and method of adaptive power control of integrated circuits are disclosed. A desirable operating frequency is determined for the integrated circuit. The integrated circuit may be a microprocessor. The desirable operating frequency may be determined based upon a determined processing load desired of the microprocessor. An optimal voltage for operating the microprocessor at the desired operating frequency is selected. The selection is based upon characteristics that are specific to the microprocessor. The microprocessor is operated at the optimal voltage.

Embodiments of the present invention provide a means to adaptively control power consumption of an integrated circuit based upon specific characteristics of the integrated circuit. Further embodiments of the present invention provide for the above mentioned solution to be achieved with existing semiconductor processes and equipment without revamping well established tools and techniques.

The preferred embodiment of the present invention, adaptive power control based on pre package characterization of integrated circuits, is thus described. While the present invention has been described in particular embodiments, it should be appreciated that the present invention should not be construed as limited by such embodiments, but rather construed according to the below claims.

The preferred embodiment of the present invention, adaptive power control based on pre-package characterization of integrated circuits, is thus described. While the present invention has been described in particular embodiments, it should be appreciated that the present invention should not be construed as limited by such embodiments, but rather construed according to the below claims.

What is claimed is:

1. An integrated circuit comprising:
   logic configured to select an operating frequency for said integrated circuit independently of operating voltage;
   logic configured to access information stored within and specific to said integrated circuit, said information used to determine a voltage for operating said integrated circuit at said operating frequency, said voltage based upon characteristics of said integrated circuit; and
   logic configured to operate said integrated circuit at said voltage.

2. The integrated circuit of claim 1 wherein said information is encoded within said integrated circuit prior to packaging of said integrated circuit.

3. The integrated circuit as described in claim 1 further comprising logic configured to operate said integrated circuit at said operating frequency while operating at said voltage.

4. The integrated circuit as described in claim 1 wherein said characteristics of said integrated circuit comprise a temperature measurement of said integrated circuit.

5. The integrated circuit as described in claim 4 wherein said temperature measurement is made proximate to said accessing.

6. The integrated circuit as described in claim 1 wherein said information comprises a mapping into one of a plurality of sets of frequency-voltage operating points, wherein each said set comprises at least two frequency-voltage operating points.

7. The integrated circuit as described in claim 6 wherein said plurality of sets of frequency-voltage operating points are not stored in said integrated circuit.

8. An apparatus comprising:
   means for selecting an operating frequency for an integrated circuit independently of operating voltage;
   means for accessing information stored within and specific to said integrated circuit, said information used to determine a voltage for operating said integrated circuit at said operating frequency, said voltage based upon characteristics of said integrated circuit; and
   means for operating said integrated circuit at said voltage.

9. The apparatus of claim 8 wherein said information is encoded within said integrated circuit prior to packaging of said integrated circuit.

10. The apparatus as described in claim 8 further comprising means for operating said integrated circuit at said operating frequency while operating at said voltage.

11. The apparatus as described in claim 8 wherein said characteristics of said integrated circuit comprise a temperature measurement of said integrated circuit.

12. The apparatus as described in claim 11 wherein said temperature measurement is made proximate to said accessing.

13. The apparatus as described in claim 8 wherein said information comprises a mapping into one of a plurality of sets of frequency-voltage operating points, wherein each said set comprises at least two frequency-voltage operating points.

14. The apparatus as described in claim 13 wherein said plurality of sets of frequency-voltage operating points are not stored in said integrated circuit.

* * * * *